(12) United States Patent
Hurtado

(10) Patent No.: US 12,735,332 B1
(45) **Date of Patent: *Sep. 15, 2026**

(54) DISTILLATION USING MECHANICAL ADVANTAGE AND A SINGLE FLUID

(71) Applicant: Arthur Francisco Hurtado, Riverside, CA (US)

(72) Inventor: Arthur Francisco Hurtado, Riverside, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/201,764

(22) Filed: May 25, 2023

Related U.S. Application Data

(63) Continuation-in-part of application No. 16/700,124, filed on Dec. 2, 2019, now Pat. No. 11,298,631, which is a continuation-in-part of application No. 15/230,295, filed on Aug. 5, 2016, now Pat. No. 10,532,934, which is a continuation-in-part of application No. 14/562,617, filed on Dec. 5, 2014, now Pat. No. 10,233,094.

(51) Int. Cl.
*C02F 1/04* (2023.01)
*B01D 3/00* (2006.01)
*F25B 7/00* (2006.01)
*F25B 11/02* (2006.01)
*F25B 27/00* (2006.01)
*C02F 103/08* (2006.01)

(52) U.S. Cl.
CPC .............. *C02F 1/041* (2013.01); *B01D 3/007* (2013.01); *F25B 7/00* (2013.01); *F25B 11/02* (2013.01); *F25B 27/005* (2013.01); *C02F 2103/08* (2013.01)

(58) Field of Classification Search
CPC . B01D 3/007; C02F 1/041; F25B 7/00; F25B 11/02; F25B 27/005
See application file for complete search history.

(56) References Cited

U.S. PATENT DOCUMENTS

| | | | | | |
|---|---|---|---|---|---|
| 3,515,645 | A * | 6/1970 | Wetch | B01D 3/065 | 202/205 |
| 3,607,668 | A * | 9/1971 | Williamson | C02F 1/04 | 202/173 |
| 3,986,938 | A * | 10/1976 | Smith, Jr. | B01D 1/26 | 202/173 |
| 4,096,039 | A * | 6/1978 | Carnine | B01D 3/42 | 202/205 |
| 4,402,795 | A * | 9/1983 | Erickson | F25B 15/008 | 203/25 |
| 4,420,373 | A * | 12/1983 | Egosi | F25B 30/00 | 159/24.2 |
| 4,671,856 | A * | 6/1987 | Sears | B01D 1/221 | 165/47 |
| 4,869,067 | A * | 9/1989 | Sears | F28F 3/083 | 60/645 |

(Continued)

*Primary Examiner* — Jonathan Miller

(57) ABSTRACT

An energy-saving method and system for distilling, desalinating or purifying water relating to a method of increasing the amount of heat recycled back into the system. The system involves powering a compressor and using a series of expanders and inducing a mechanical advantage, wherein the expanders displace a greater volume of gas than does the compressor. The energy derived from each expander cumulatively powers the compressor. The compressor draws vapor from seawater contained in an evaporator and compresses it into a condenser.

16 Claims, 22 Drawing Sheets

(56) References Cited

U.S. PATENT DOCUMENTS

| | | | | |
|---|---|---|---|---|
| 5,968,321 | A * | 10/1999 | Sears | B01D 3/42 203/1 |
| 8,539,772 | B2 * | 9/2013 | Hurtado | F03G 7/06 60/671 |
| 9,784,478 | B2 * | 10/2017 | Hurtado | F25B 27/00 |
| 10,150,681 | B2 * | 12/2018 | Yuh | C02F 1/048 |
| 10,233,094 | B2 * | 3/2019 | Hurtado | C02F 1/041 |
| 10,532,934 | B1 * | 1/2020 | Hurtado | B01D 1/2846 |
| 10,612,821 | B1 * | 4/2020 | Fernando | F25B 1/10 |
| 11,298,631 | B1 * | 4/2022 | Hurtado | B01D 1/2887 |
| 11,913,686 | B1 * | 2/2024 | Hurtado | F25B 7/00 |
| 2005/0072662 | A1 * | 4/2005 | Holtzapple | F28D 9/0037 159/2.3 |
| 2008/0083605 | A1 * | 4/2008 | Holtzapple | B01D 1/28 239/398 |
| 2011/0179788 | A1 * | 7/2011 | Hurtado | F03G 7/06 60/641.6 |
| 2013/0263616 | A1 * | 10/2013 | Pungtrakul | C02F 1/12 165/104.19 |
| 2013/0341177 | A1 * | 12/2013 | Ng | C02F 1/043 203/41 |
| 2014/0021031 | A1 * | 1/2014 | Koivusaari | C02F 1/041 202/185.1 |
| 2014/0034479 | A1 * | 2/2014 | Peng | C02F 1/16 202/172 |
| 2014/0102130 | A1 * | 4/2014 | Hurtado | F01K 25/08 62/502 |
| 2015/0158740 | A1 * | 6/2015 | Hurtado | F25B 27/005 62/235.1 |

* cited by examiner

600A

600B

DISTILLATION USING MECHANICAL ADVANTAGE AND A SINGLE FLUID

CROSS-REFERENCE TO RELATED APPLICATIONS

This application claims priority to U.S. Pat. No. 10,233,094 filed Dec. 5, 2014 and U.S. Pat. No. 10,532,934 filed on Aug. 5, 2016, and U.S. Pat. No. 11,298,631 filed on Dec. 2, 2019 and Non Provisional Ser. No. 17/682,628 filed on Feb. 28, 2022. The respective disclosures are incorporated herein by reference to the extent that they do not conflict with the present application.

BACKGROUND OF THE INVENTION

1. Field of the Invention

The present invention relates generally to distillation systems and methods, and particularly to a low cost, energy saving method and system for distilling, descaling or purifying water.

2. Description of the Related Art

Distillation is well known process and involves heating a liquid until it boils into a gas-phase, then condensing the gas back into a liquid-phase and collecting the condensed gas. The heating of the liquid involves high energy consumption, which makes the distillation process expensive. What is needed is a new and improved distillation method and system that achieves the same results with considerably less amount of energy.

The aspects or the problems and the associated solution presented in this section could be or could have pursued; they are not necessarily approaches that have been previously conceived or pursued. Therefore unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, the system to distill seawater with a condenser and recycled heat includes a compressor that is powered by an external motor or by energy derived from an expansion system. The compressor draws in water vapor from the boiling seawater contained in an evaporator and compresses the vapor to an elevated temperature into a condenser where it condenses into pure water.

In another exemplary embodiment, the system to distill seawater utilizes mechanical advantage between an expansion system and a compressor to drive the distillation system. The mechanical advantage is produced utilizing two fluids having different vapor pressure properties. System, produced by two fluids having different vapor pressures, to drive the compressor.

In another exemplary embodiment, the system to distill seawater utilizes mechanical advantage between an expansion system and a compressor to drive the distillation system. The mechanical advantage is produced by an expander displacing a greater volume of gas than a compressor.

The above embodiments and advantages, as well as other embodiments and advantages, will become apparent from the ensuing description and accompanying drawings.

BRIEF DESCRIPTION OF THE DRAWINGS

For exemplification purpose, and not for limitation purposes, aspects, embodiments or examples of the invention are illustrate in the figures of the accompanying drawings, in which:

FIG. 21 illustrating a diagram of a distillation system containing a single fluid throughout the system with multiple expanders.

DETAILED DESCRIPTION

Figure 1:
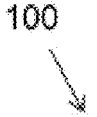
FIG. 1 illustrates a diagram of a distillation system, according to an aspect.
Figure 1:
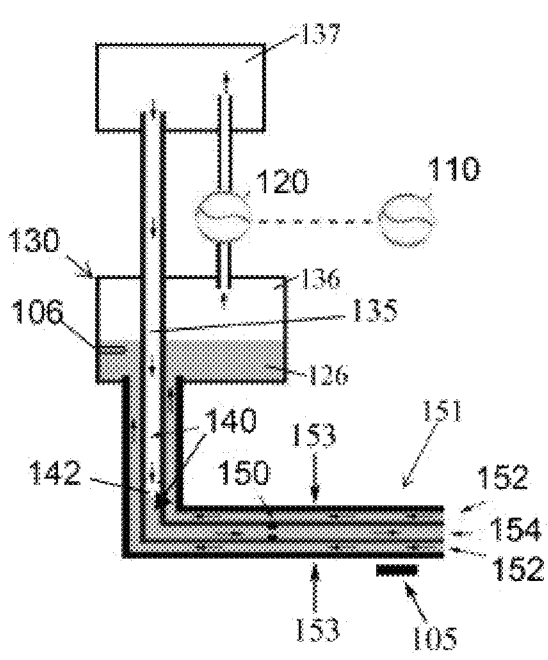

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purpose. It should be understood that structural and/or logical modifications could be made by someone of ordinary skills in the art without departing firm the scope of the invention. Therefore, the scope of the invention is defined by the accompanying claims and their equivalents.

FIG. 1 illustrates a diagram of a distillation system, according to an embodiment. As shown, the distillation system 100 having a condenser 135 immersed within the seawater 126 contained in evaporator 130 and in addition may have a condensing probe 140, an extension of condenser 135, that may be encircled by an outer pipe 153 containing incoming seawater 152, such that heat is transferred from the condensing probe 140 into the encircled seawater 152. Preferably, the condensing probe 140 is configured to increase the surface area and duration that heat is transferred from the high temperature steam 137 onto the incoming seawater 152. To this end, the condensing probe 140 depicted in FIG. 1 and described herein is only an example. Various other configurations may be adopted. For example, a plurality of probes may be utilized to increase further the surface area and thus increase heat transfer. It is advantageous to insert the condensing probe 140 deep into the encircling seawater to insure early contact with the cool incoming seawater. In this regard the incoming seawater begins to absorb heat early on and by the time it reaches the evaporator 130, enough heat should have been absorbed and its temperature should have gradually risen to the level of the temperature of the seawater 126 boiling in the evaporator 130. A heat source may 105, 305 may be applied to the incoming seawater 152, as necessary, to any point prior to reaching the area of the condensing probe 140 to ensure the seawater reaches the desired temperature as it enters the evaporator 130.

The highest temperature level of the seawater is in the evaporator 130 and the lowest temperature level is at the holding reservoir (FIG. 2, 230) as it enters the system. Hence the greatest rate of condensation within the condensing probe 140 occurs when the steam 137 initially comes in contact with the cool incoming seawater 152 and slowest rate of condensation occurs when the condensing probe 140 approximates the evaporator 130.

To some extent the early onset of condensation within die condensing probe 140 at the cooler regions of the incoming seawater help decrease the pressure level within the condensing probe 140 and hence the work required by the compressor 120 to compress the vapor 136 from the evaporator 130 into the condenser 135. Since a portion of the steam 137 has condensed at the cooler regions of the incoming seawater, it has a suction effect on the vapor entering the condensing probe 140 from the compressor 120.

A form of circulation occurs as the incoming seawater 152 boils at the outer surface of the condensing probe 140 and bubbles ascend into the evaporator 130. This improves heat exchange and helps speed up the distillation rate.

Insulation may be applied t, the distal portion and the tip 142 of the condensing probe 140, as necessary, to slow down and regulate the rate of heat transfer and avoid extreme temperature differentials between the high temperature of the steam 137 within the condensing probe 140 and the cool temperature to the incoming seawater 152, to prevent cracking or damage to the condensing probe 140 due to the extreme temperature differences.

A flow regulator 150 may be placed neat the end of the outflow of the condensed water 154 to regulate the amount of steam 137 contained within the condensing probe 140 and the duration the steam 137 conducts heat into the inflows seawater 152, thus regulating the rate of heat exchange into the incoming seawater 152 to assure and regulate the time duration for optimum heat transfer. Also, by regulating the outflow of condensed water 154, suitable pressure within the condensing probe 140 is maintained avoiding the temperature of die steam to drop below the temperature of the evaporator 130. If the pressure in the condensing probe 140 is higher than atmospheric pressure, the condensed water 154 should flow out as the flow regulator 150 releases.

Subsequent to the condensation of the steam 137, the outflow of condensed water 154 exiting the condensing probe 140 still contains usable heat capable of being recycled back to the system. A counter current heat exchange system 151 (FIG. 2, 200) may help recapture and recycle this heat back into the distillation system 100.

As the condensed water 154 and seawater 152 flow in opposite directions, heat from the condensed hot water 154 is gradually given-off to the surrounding incoming cooler seawater 152. Hence, the outflowing condensed water 154 becomes cooler. Conversely the inflowing seawater 152 becomes hotter as it absorbs heat and approaches the condensing probe 140 and ultimately the evaporator 130.

The compressor 120 may be actuated by an external motor 110 or by other means as it will be explained hereinafter when referring to FIGS. 3-4 for example. The compressor 120 draws in water vapor 136 from the boiling seawater contained in an evaporator 134 and compresses the vapor into a condenser 135 awl further into a condensing probe 140 as shown, where it condense into pure water.

Thus, it should be apparent that an important aspect is to recycle the heat in the distillation process and reuse the heat to run the distillation process again, creating an energy loop. To help achieve this process, the condenser 135 and/or the condensing probe 140 may be placed completely or partially (as shown in FIG. 1) within the evaporator 130 so that the heat given off by the condenser 135 is absorbed by the boiling seawater 126 in the evaporator. Any portion- of de condenser 135 or condensing probe 140 not placed within the evaporator 130 or within a heat exchange system 151, would preferably need to be insulated such that to prevent heat loss by the distillation system 100. This is particularly important, in that this causes the latent heat of condensation to be absorbed by the latent heat of vaporization. The reabsorption of the latent heat back into die system greatly reduce, the amount of external energy required to operate the distillation process. The latent heat of vaporization comprises the greatest portion of heat required to operate the distillation process. As an example, the latent heat of vaporization of water at 100 degrees C. is approximately 540 cal/gm. However, if this heat is recycled, rather than allowing the heat to escape into the environment, it would greatly decease the amount of energy required to run the distillation system.

For the purpose of this discussion, for simplification, we are assuming that distilled water and seawater have the sane boiling point and latent heat of vaporization at a given temperature and pressure. In this example, also for simplification, we are assuming that the starting temperature of the seawater 126 in the evaporator 130 is preheated to 212 Fahrenheit (F) and the steam 136 from the evaporator is compressed by compressor 120 to a temperature of 222 F. However, in reality at a given pressure, seawater boils at a slighter higher temperature than pure water, (approximately 102 Celsius degree (216° F.) at sea level). For this reason, the steam 136 emitted from the evaporator 130 containing the boiling seawater 126 is compressed into a higher temperature (222 F) so that the steam 137 may be, as explained earlier, passed through the cooler evaporator 130 and condensated. In this process heat is returned mid recycled back to the evaporator.

It should be understood that, the starting temperature of the evaporator 130, as well as any heat required to maintain its temperature due to heat loss of the system, may be provided by a heating source either through heating elements 106, solar energy or burning of fuels of other suitable means.

The preceding example pertains to distilling seawater to obtain pure water. However any liquid, for example liquid chemicals used in industries, or unpurified water may be distilled using the system from FIG. 1, including that of treatment facilities, brackish water, etc.

Figure 2:
FIG. 2 illustrates a diagram of a counter current heat exchange system, according to an aspect.
Figure 2:
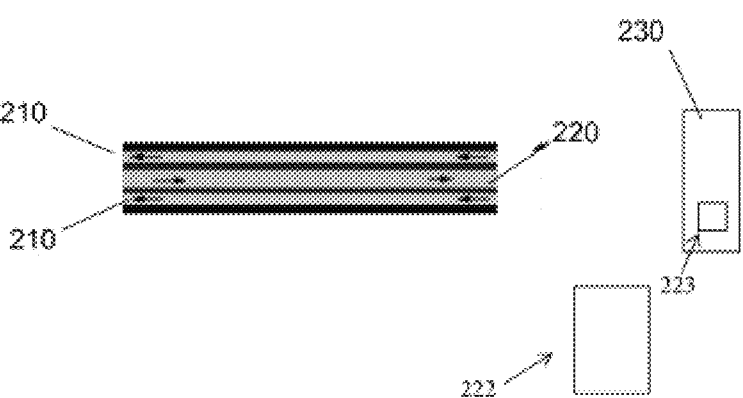

FIG. 2 illustrates a diagram of a counter current heat exchange system 200.

A complete beat exchange is difficult if not impossible. However, the goal is to come as close as possible to at complete heat exchange.

Toward the end of the outflow of the condensed water 220, the temperature of the condensed water 220 is the lowest and the heat absorption rate is the slowest. At this point, to optimize heat exchange, the condensed water 220 may be passed through coils or radiators, before it enters a condensed water holding tank 222. Furthermore, the outflowing condensed water 220 may be piped through and stored in container(s) 223 within the holding reservoir 230 containing the inflowing seawater, so that the last bit of the heat from the condensed water 220 is transferred to the sea water 210 therein. The storage containers 223 should be constructed of material that readily conducts heat.

Theoretically, if the counter current heat exchange 200 is long enough and insulated well to prevent heat loss, the condensed water 220 may give off enough heat and its temperature may be reduced to be the same or close to the temperature of the incoming seawater 210 and the temperature of the incoming seawater 210 may absorb heat and its temperature increased to be the same or close to the temperature of the condensed water 220 leaving the condensing probe (FIG. 1, 140).

Expansive Section

Figure 3:
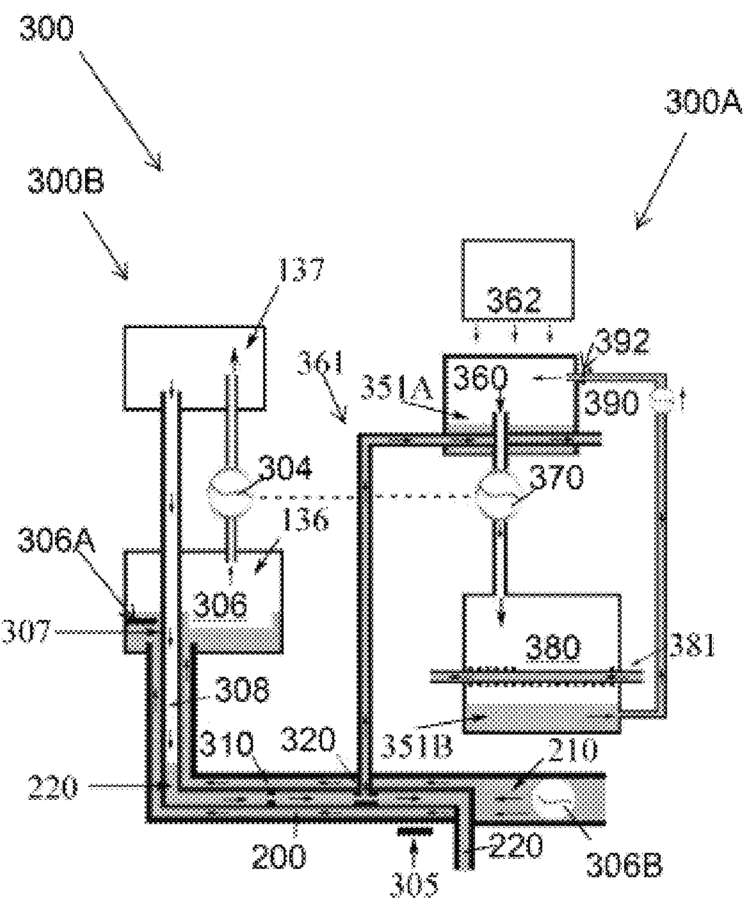
FIG. 3 illustrates a diagram of a distillation system having an expansive section as a source of energy to power the distillation system, according to an aspect.

FIG. 3 illustrates a diagram of a distillation system having an expansive section as a source of energy to power the distillation system, replacing or augmenting motor 110, according to an embodiment.

An important aspect of the distillation system 300 of FIG. 3 is the use of a fluid 351A and 351B in which the fluid 351A and fluid 351B may, be a refrigerant, R-410A for example. In this example, refrigerant R-410A. 351A is in a gas phase and liquid phase mixture contained in an evaporator or a boiler 360, and may absorb heat from its surroundings causing the refrigerant 351A to boil. The increase in the refrigerant vapor 351A in the boiler 360 causes an increase in pressure. The pressurized refrigerant vapor 351A is preferably communicated from the boiler 360 through an expander 370 into condenser 380 where the gas-phase refrigerant 351A condenses into a liquid-phase 351B, resulting in a decrease in pressure in condenser 380. Heat muay be expelled from condenser 380 into a cooler environment. The expander 370 is placed between the high pressure of the boiler 360 and the low pressure of condenser 380. The expander 370 is preferably actuated by the difference in pressure between the boiler 360 and condenser 380 and the energy derived from the expander 370 is transferred to and actuate the compressor 304 of the compressive section 3008 of the distillation system 300. The condensed liquid-phase refrigerant 3518 is preferably pumped from condenser 380 back into the boiler 360 via a pump 390.

The portion of the system from which energy is derived, including the boiler 360, expander 370 and condenser 380 is termed the expansive section 300A and the portion of the section in which the compressor 304 compresses vapor, including the evaporator 306, compressor 304, condenser 307 and the condensing probe 308 are termed the compressive section 300B.

An option for enhancing the vaporization of the liquid-phase refrigerant 351B, as it enters the boiler 36G, is to pump the liquid-phase refrigerant 351B with sufficient force through an expansion valve 392 creating a spray of the refrigerant 351B. The sudden drop in pressure causes the refrigerant 351B droplets to vaporize mt ore readily.

The heat source for the boiler 360 may preferably come from ambient temperatures or may be fortified by, for example, solar energy such as from parabolic reflectors, reflective mirrors 362, solar panels or the like.

As previously discussed, the heat source for the evaporator 306/130 for providing the starting temperature and temperature maintenance of the seawater may be provided by a heating element 306A/106, solar energy, burning fuels or the like.

A pump 306B may be provided to increase the pressure of the incoming seawater into die evaporator 306 thus providing for higher boiling temperatures of the seawater. As it will be discussed later greater yields of distilled water are achieved when die temperature of the seawater in the evaporator is at higher levels. This is due to the vapor concentration and saturation points becoming highest as die temperature of the water vapor increases. Together, in association with the compressor 304, the pump 306B and the outflow regulating valve 310 regulate and maintain the pressure and temperature of the evaporator 306 and die condensing probe 308. Pump 306B may also be used to increase heat exchange by circulating the seawater about the condensing probe 308. For example, a whirling motion of the seawater around the condensing probe 308 may be created by the implementation of pump 306B, or the like, having a dual role and acting as an impeller to circulate the seawater.

Another option of realizing heat is to divert a portion or all of the outflow of the condensed water 220, through piping 161, into the boiler 340 of the expansive section 300A. This is particularly useful at the end phase of the counter current heat exchange 200. At the end phase, the condensed water 220 is at a low temperature due to most of its heat having been given-off. Additionally, at this point there is a slow rate of heat exchange. Provided the temperature of the condensed water 220, diverted into piping 361, is high enough to cause the refrigerant 351 A to xiii in the boiler 360, the low grade heat of the condensed water 220 will be absorbed by the latent heat of the boiling refrigerant 351A. The absorption of heat, in this manner, is at a much faster rate than it would have been if the condensed water 220 would have ran its normal course and had exchanged its heat through ordinary conduction. Furthermore, the heat from the diverted condensed water 220 may be utilized by die boiler 360 as an energy source to help drive the expander 370. A 3-way valve 320 may regulate the portion of the condensed water 220 delivered to the boiler 360 of the expansive section 300A of the system. As an option, heat from condenser 135/307 may also be diverted through piping 361 to boiler 360 in the form of steam before it becomes condensed in condensing probe 140/308 or may be diverted in the form of condensed water 220 at any point along the counter current heat exchange system 151. In the instance where steam is diverted to boiler 360, the steam becomes condensed in boiler 360. In each instance whether the heat is derived from steam or condensed water, the heat given off is captured as an energy source by boiler 360 as refrigerant 351A expands during boiling and help drive the expander 370. It is noted that heat from condenser 307 either in form of steam 137 or condensed water 220 may be diverted through piping 361 into boiler 360 and bypassing either the condensing probe 308 or counter current heat exchange system 200 or both.

Piped cool ocean water 381 may be utilized to condense the refrigerant 351A in condenser 380 of the expansive section 300A of the system. Seawater of cooler temperatures may be obtained from the depths of the ocean, this providing a greater temperature differential between die boiler 360 and condenser 381 and in turn a greater force exerted on the expander 370. As the piped ocean water 381 passes through condenser 380, heat is absorbed and transferred to the ocean water 381.

Yet another embodiment involving the recapturing of heat is to make use of the heated ocean water as it exits condenser 380. The embodiment includes piping the cool seawater 381 through the chamber of condenser 380. As refrigerant 351A vapor becomes condensed, heat is transferred to the cool incoming piped seawater 380. As a result, the seawater 380 becomes pre-wanned and then may be stored in a holding reservoir (FIG. 2, 230) before it enters the counter current heat exchange system 200 and subsequently into the evaporator 306 of the compressive section 300B of the distillation system. The pre-warned seawater may also enter the evaporator 306 directly bypassing the counter current heat exchange system 200.

Figure 4:
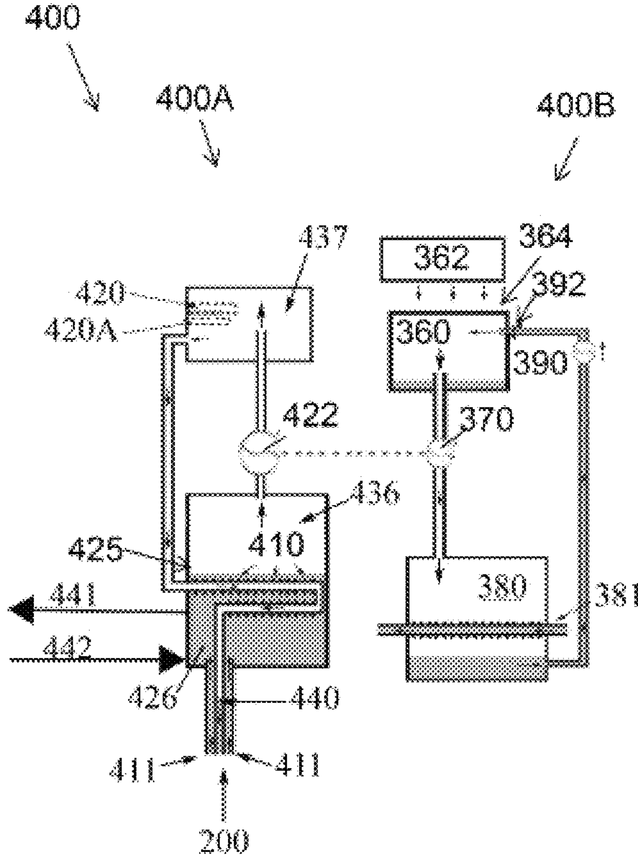
FIG. 4 illustrates a diagram of a distillation system having an expansive section as a source of energy to power the distillation system and a more elaborate condenser with an increased surface area, according to an aspect.

FIG. 4 illustrates a diagram of a distillation system 400 having an expansive section 400B as a source of energy to power the distillation system and a more elaborate condenser 410 having an increased surface area, according to an embodiment.

The evaporator 425 receives seawater 411 from the counter current heat exchange system 200 and at this point (when entering the evaporator 421 the temperature level of the seawater 426 contained in evaporator 425 should be at (or near the temperature of this boiling point. At this point the seawater 426 has initially reached its boiling point. However, the seawater 426 must still gain additional heat to overcome the latent heat requirement in order for it to boil. Since latent heat requires the greatest portion of heat in the distillation process a condenser 410 filled with steam having a temperature greater than that of the seawater 426 from evaporator 426 as well as having an increased surface ava is desirable.

For the purpose of simplification, the heat recycling element 361, shown in FIG. 3, regarding diverting the piped condensed hot water 220 or steam 137 from the counter current heat exchange system 200 has been omitted from the drawing of FIG. 4. However, all of the embodiments and elements of FIG. 3 may be incorporated into FIG. 4.

A heating source or element 420 coupled to circulating fin 420A, similar to that of a hair dyer, may be placed inside the chamber leading to the condenser 411) to heat the steam 437 of the condenser 410 to assure the temperature of the steam 437 in the condenser 410 is adequately above the temperature of the evaporator 425. Less heat is required to heat the steam in the condenser 410 than it is to heat the liquid water in the evaporator 425. To raise the temperature of 1 Kg of steam by 1° C., requires half the amount of heat to raise the same quantity of liquid water by 1° C.

Additionally there may be times when the water 424 within evaporator 425 may be heated by heating source 306A or heating incoming seawater 220 by source 305 prior to entering evaporator 425 to increase or maintain the temperature at a desired starting point or during times when the process of recycling heat is insufficient or faulty.

FIG. 3 and FIG. 4 depict the expansive se tion 400B the system producing die energy to drive the compressive section 400A of the system. However, the expansive section 400B of the system may be eliminated and instead driven by a motor 110 or the like, as illustrated in FIG. 1. Use of the expansive section 400B however, may increase the efficiently of the distillation system 400 (300) in FIG. 3) as it May be powered by readily available heat energy in the environment (e.g., solar heat captured by solar panels, mirrors, or solar heat accumulated in the attic of houses, etc).

Additionally, on days when the sun is not strong enough to provide the boiler 360 with sufficient energy to fully drive the compressor 422, external energy may be applied to augment the work of the expander 370. The extremal energy may be in the from of a motor 110 (or other energy source), coupled to the expander 370 and/or the compressor 422. In the augmentation configuration, die expander 370 may derive its energy partially from a solar source and the remaining portion from an external augmenting motor.

Example 1 is an illustration of a mechanical advantage system in which the fluid 351A. 351B is refrigerant R-410A and is being used in the expansive section 400B to drive the compressive section 400A to distill water. The boiler 364) contains a gas phase and liquid phase mixture of the refrigerant R-410 351 A. Evaporator 425 contains seawater and condenser 410 contains condensed or the resultant distilled water 440. For the purpose of this illustration, it is assumed that seawater and pure water have the same boiling % points.

The following example assumes a starting temperature in the evaporator 425 to be 212 F and that all of the heat is circulated back into the system 400.

Example 1

Chart 1 lists the parameters to be applied to the systems illustrated in FIG. 3 or FIG. 4.

| Chart 1<br>Water | | |
|---|---|---|
| Condenser 410: | Temperature 222° F. | Pressure 18 PSI (denoted by P1) |
| Evaporator 425: | Temperature 212° F. | Pressure 14.69 PSI (denoted byP2) |

| R-410A | | |
|---|---|---|
| Boiler 360: | Temperature 80° F. | Pressure 236 PSI (denoted by P3) |
| Condenser 380: | Temperature 70° F. | Pressure 201.5 PSI (denoted byP4) |

Utilizing the Parameters Listed in Chart 1 and if A2=1 Unit:

$$A1(P1-P2)=A2(P3-P4) \quad \text{Equation 1}$$

Note: A1 and A2 is the area that partitions the difference in pressure acting upon compressor 422 and expander 370 respectively. At equilibrium there is a mechanical advantage of 10.42. If the area of displacement is proportional to the volume of displacement, then for every cubic meter of R410-A vapor displaced by the expander 370, 10.42 cubic mete are displaced by the compressor 422.

If the compressor displace, 10.42 times the volume of the expander, then:

$$P1V1=P2V2 \text{ or Work } 1=\text{Work } 2$$

Work 1 compresses and Work 2 expands or $$3.31 \text{ PSI } (10.42 \text{ cubic meters}) = 34.5 \text{ PSI } (1 \text{ cubic meter})$$

$$34.5 \text{ PSI } (\text{cubic meter}) = 34.5 \text{ PSI } (\text{cubic meter})$$

If the temperature of evaporator 306/425 is 212° F. then the density of steam at this temperature is 0.590 Kg/cubic meter: Then is a yield of: 10.42 (0.590 Kg/cubic meter)= 6.14 Kg of water for every cubic meter of R410-A displaced by the expander 370.

A relatively small temperature difference of 10° F. between the temperature of the ambient air and that of the ocean water, is required to operate the system. In this example, this temperature difference between the ambient air and the ocean water may be readily obtained naturally from the environment.

However, if the parabolic reflect-r or reflective mirrors 362 or other sources were utilized to provide additional heat to the boiler 360 much greater yields may be produced.

For example, if the temperature of the boiler 360 was raised by 10° F. to a temperature of 90° F. utilizing similar calculations as diose performed in Example 1, a yield of 12.244 Kg of water for every cubic meter of R410-A displaced by the expander 370 would be obtained.

Compared to the boiler being at 80° F., producing a yield of 6.14 Kg/cubic meter, the boiler at 90° F., produces a yield of 12.97 Kg/cubic meter. The yield has more than doubled. Alternatively, the option of utilizing a motor 110 as shown in FIG. 1 or a combination of a motor 110 and art expansive section 400B to operate the compressive section 400A may be implemented.

Creating a Heat Loop

Assuming that most of the heat was recycled and there was minimal heat loss in the compressive section 400A of the system, the compressive section 400A would be assumed to be a closed loop system. When the expander 370 drives the compressor 422, energy is introduced into the closed loop as the compressor 422 increases the temperature of the steam 437 in the condenser 410. It the recycling mechanism was efficient enough, most of the heat would return back into the compressive section 400A, including the heat that was introduced by the expander 370. Theoretically, the temperature of the evaporator 425 would eventually increase and hence increase the temperature of the entire compressive section 400A. This is taking into consideration that the energy introduced by the expander 370 becomes incorporated into part of the total heat contained in the compressive section 404A.

If both the seawater 426 in the evaporator 425 and the condensed water 220 was at a temperature of 212° F., and assumed to contained the same amount of internal heat and that if all the heat was recycled back into the loop, the only energy needed to run the process would be that of raising the temperature level of the steam 416 front the evaporator 425 just high enough so that the steam 437 may condense and give-off heat back to the cooler seawater 426 in the evaporator 425.

Insulation is of great importance in minimizing heat loss. An effective method of insulation is that of encasing the components of the compressive section 400A and creating a vacuum between the components and encasing. This would function much like that of a thermos.

All heat exchange elements may be comprised of coils, radiators, tube convolutions or the like to increase surface area for the purpose of achieving optimum heat exchange.

The introduction of external energy, into the heat loop by pumping the inflow of seawater 210 to elevated pressures into the evaporator 306/425 also becomes recycled. The pump 306B steps up the system by increasing the pressure in the evaporator 306/425 and elevating the starting temperature in which the seawater 426 boils (see FIG. 3). The expander 370, driving the compressor 304/422, is now able to compress the steam 436 from the stepped-up evaporator 425 into a proportionality higher pressure and temperature into the condenser 410/307/308. The steam 437 within the condenser 410 is then able to transfer heat, at a higher temperature level, back into the evaporator 425, thus maintaining the stepped-up temperature of the evaporator 425. Heat, if required, may be applied to the seawater in the evaporator 425 to maintain or stabilize the system.

Salt Removal from the Evaporator

In order to preserve heat, the salt that becomes concentrated in the evaporator 425 may be expelled with the use of a second counter current heat exchange system. However, in this second counter current application the outgoing salt water 441 leaving evaporator 425 has much more at concentrated than the incoming seawater 442. As the high salt-concentrated water 426 of evaporator 425 is being replaced with the less-concentrated incoming seawater 442, the salt level of the salt water 426 in evaporator 425 becomes less concentrated. Similarly, as previously illustrated in the counter current heat exchange system 200 in FIG. 2, the outgoing salt water 441 may be encircled by the incoming seawater 442 and in the process the incoming seawater 442 absorbs the heat from the outgoing salt water 441, thereby recycling and preserving heat. Furthermore, the seawater 426 in evaporator 425 may be allowed to concentrate to the point the concentrated salt precipitates out of solution and settles to the bottom. The precipitated salt may then be pumped out.

Figures 5A, 5B:
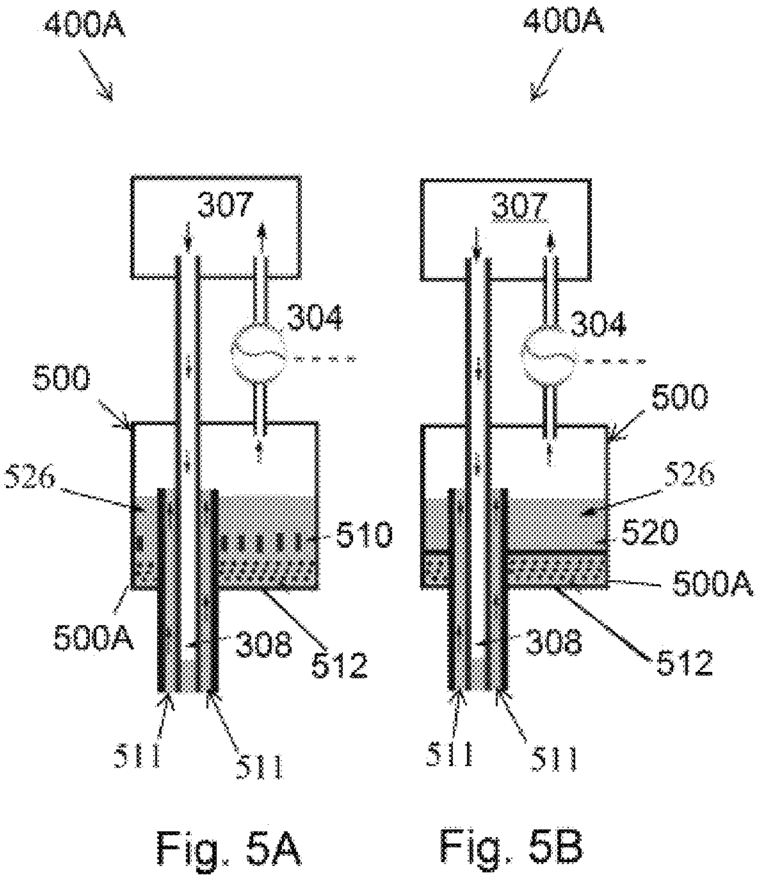
FIG. 5A illustrates a partial diagram of a distillation system having an evaporator with a plurality of vertical blades, according to an aspect.
FIG. 5B illustrates a partial diagram of a distillation system having an evaporator with a plurality of horizontal blades, according to at aspect.

FIG. 5A illustrates a partial diagram of a distillation system having an evaporator with a plurality of vertical blades, according to an embodiment.

A series of vertical blades 510 may be placed across the lower portion of evaporator 500, allowing the precipitated salt to pass between the vertical blade 510 and settle onto a tray 512 located at the bottom 500A of evaporator 500.

FIG. 5B illustrates a partial diagram of a distillation system having an evaporator with a plurality of horizontal blades, according to an embodiment.

When the tray 512 becomes filled with salt, the tray 512 is then compartmentalized as the vertical blades 510 rotate horizontally and create a partition separating the tray 512 from the sea-water 526 contained in evaporator 500. Once compartmentalized, the tray 512 may be removed from the bottom 500 A of evaporator 500 and emptied of its precipitated salt content. The empty tray 512 is then placed back into the bottom of evaporator 500 and the horizonal blades 520 resume their vertical position. The intake of seawater 511 is pumped to a higher level than the seawater 526 contained in evaporator 500 to avoid the back flow of the concentrated seawater 526.

Seawater containing higher concentrations of salt has higher boiling temperatures. However, this is of less significance if the heat is recycled and returned back through the loop. It is noted that the particular parameters utilized in these examples are for illustrative purposes, and an array of different parameters and types of refrigerants may be utilized that may produce similar or improved results.

Overview of the Process

The boiler 364) contains a gas phase and liquid phase mixture of refrigerant R-410A 351B and absorb beat from any available source including ambient heat, sun panels or parabolic reflectors 362. In this particular illustration the temperature of the refrigerant R-410A (351A in the boiler 360) is 80° F., and pressure is 236 PSI. The refrigerant R-410A being utilizing in this example is for illustrative purposes only, any other refrigerant or liquid may be utilized in its place.

Condenser 380 transforms gas-phase refrigerant 351A to liquid-phase refrigerant 351B and gives-off heat to the cool incoming piped seawater 381. The temperature in condenser 380 containing R-410A is 70° F., and the pressure is 201 PSI.

Evaporator 425 contains seawater 426 to be distilled. The temperature of the seawater 426 in evaporator 425 is 212° F., and the pressure is 14.69 PSI.

Condenser 410 is located within evaporator 425. The steam 437 in condenser 410 condenses into pure water 440 as it gives-off heat to the seawater 426 in evaporator 425. The temperature in condenser 410 containing steam 437 is 222° F., and the pressure is 18 PSI.

The compressor 422 draws steam 436 from the seawater 426 contained in evaporator 425 and compresses it into condenser 410. The temperature of the seawater in evaporator 425 is 212° F., and the temperature of the steam 437 in condenser 410 is 222° F. Condenser 410 is located within evaporator 425, and concurrently, heat is reabsorbed from condenser 410 back to the seawater 426 in evaporator 425. In this matter latent heat becomes recycled as the latent heat is given-off from condenser 414 and absorbed by the evaporator 425.

Example 2 is an illustration showing a decrease in the level of mechanical advantage when water is utilized on the expansive section 400B, instead of R410A. Taking for example the parameters of chart 1 and instead of using R-410A on the expansive section 400B, R-410A is replaced with water. All temperature parameters remain the same as depicted in example 1 and listed in chart 1. However, both the compressive section 400A and the expansive section 400B of the system use water.

Example 2

Use of Water as the Refrigerant

Chart 2 lists the parameters to be applied in the system illustrated in FIG. 3 and FIG. 4.

Chart 2
Water
(denoted by P1)

| | | |
|---|---|---|
| Condenser 410 | Temperature 222° F. | Pressure 18 PSI (denoted by P1) |
| Evaporator 425 | Temperature 212° F. | Pressure 14.69 PSI (denoted by P2) |
| Boller 360 | Temperature 80° F. | Pressure 507 PSI (denoted by P3) |
| Condenser 380 | Temperature 70° F. | Pressure 363 PSI (denoted by P4) |

Utilizing the parameters listed in Chart 1 and if A2=1 unit:

Note: A is the area that partitions and interphases the difference of pressure.

Equation 2:

$$A1\ (P1 - P2) = A2(P3 - P4)$$

At equilibrium there is a mechanical advantage of 0.043.

For every cubic meter of water vapor displaced by the expander 370, 0.043 cubic meters of water vapor are displaced by the compressor 304/422.

If the compressor 304/422 displaces 0.043 times the volume of the expander 370, then:

$$P1V1 = P2V2 \text{ or Work1} = \text{Work2}$$

Work 1 compresses and Work 2 expands or $$3.31\ \text{PSI}(.043\ \text{cubic meters}) = .144\ \text{PSI}(1\ \text{cubic meter})$$

$$.144\ \text{PSI}\ (\text{cubic meter}) = .144\ \text{PSI}\ (\text{cubic meter})$$

If the temperature of the evaporator is 212° F. then the density of steam at this temperature is 0.590 Kg/cubic meter. There is a yield of 0.043 (0.590 KV/cubic meter)=0.025 Kg of water vapor for every cubic meter of water vapor displaced by the expander 370. However, when utilizing R410-A in the expansive section 400B, as in example 1, it produces a much higher yield (6.14 Kg of water/cubic meter) when compared to the yield utilizing water (0.025 Kg of water/cubic meter). Utilizing R410-A in the expansive section 400B produces (6.14 kg/0.025 Kg=245.6) or 245.6 times grater yields than if water were to be utilized in the expansive section 400B.

As illustrated above, utilizing water in the expansive section 400B of this system would be impractical given that the pressure difference between the boiler 360 and the condenser 380 yields a force of only 0.144 PSI. The force acting upon the expander 370 is minimal and not sufficient to operate the system. In contrast when utilizing R410A in the expansive section 400B of this system, the pressure between the boiler 360 and the condenser 380 yields a force of 34.5 PSI.

However the system is not intended to preclude the use of water as a refrigerant, in that water may be the refrigerant of choice in some applications. In a mechanical advantage system, utilizing two fluids having different vapor pressure properties at given parameters of temperature to produce a mechanical advantage, will be termed a chemically induced mechanical advantage. In contrast, a mechanical advantage is produced by a mechanical advantage system when the expander 370 and the compressor 304/422 simultaneously displaced a different volume of fluid. In some applications, it is advantages to use a mechanical advantage in combination with a chemically induced mechanical advantage to achieve a desired outcome.

Example 3

Example 3 illustrates that distillation systems produce greater yield with increased temperature of the seawater 426 in evaporator 306/425. In this example the temperature of the seawater 426 in evaporator 425 is 281'F and the temperature of the condenser 410 is 291'F. Chart 3 lists the parameters to be applied in the system illustrated in FIG. 3 and FIG. 4. The parameters for the expansive section 400B remain the same as, those listed in chart 1. The parameters for the compressive section 400A have been increased. However, the condenser 410 and evaporator 425 on the compressive suction 400A of both chart 1 and chart 3 have a temperature difference of 10° F.

| Chart 3<br>Water | | |
|---|---|---|
| Condenser 410 | Temperature 291° F. | Pressure 58 PSI (denoted by P1) |
| Evaporator 425 | Temperature 281° F. | Pressure 50 PSI (denoted by P2) |

| R-410A | | |
|---|---|---|
| The Boiler 360 | Temperature 80° F. | Pressure 236 PSI (denoted by P3) |
| Condenser 380 | Temperature 70° F. | Pressure 201.5 PSI (denoted by P4) |

Utilizing the parameters listed in Chart 3 and if A2=1, then:

$$A1(\underbrace{P1-P2}_{\text{Compressive}}) = A2(\underbrace{P3-P4}_{\text{Expansive}}) \quad \text{Equation 3}$$

-continued $$A1(58-50)\,\text{PSI} = A2(236-201.5)\,\text{PSI}.$$

$$(A1)8\ PSI = 34.5\ PSI$$

$$A1 = 4.31\ \text{sq.in.}$$

Note: A1 and A2 is the area that partitions the difference in pressure in the compressor 304/422 and expander 370 respectively. At equilibrium a mechanical advantage of 4.31 is produced.

If the area of displacement is proportional to the volume of displacement then for every cubic meter of R410-A vapor displaced by the expander 370, 4.31 cubit meters are displaced by the compressor 304. If the temperature of the evaporator 306 is 281° F. then the density of steam at this temperature is 1.90 Kg/cubic meter:

When the temperature of the seawater 426 in evaporator 306/425 is at a temperature of 281 F, dire is a yield of: 4.31 (1.90 Kg/cubic meter)=8.19 Kg of water for every cubic meter it R410-A displaced by the expander 370. This is a greater yield than that in example 1 producing a yield of 6.14 Kg/cubic, when the seawater 426 temperature of evaporator 306/425 is at 212° F.

Example 4

Use of the Expander to Power the System

Example 4 reduces the volume displacement of the compressor 304, illustrated in example 1, by 20%. The compressor 304 initially having a volume displacement of 10.42 (Cubic meters PSI, now has a reduced volume displacement 10.42 (0.20)=8.33 (Cubic meter).

Using this new parameter in equation 1, the expansive section 300A of the system will over power the compressive section 300B of the system and will have 6.9 (Cubic meter) PSI of available work to drive the compressive section 300B. The derivation, is as follows:

$$P1V1 = P2V2 \text{ or Work1} = \text{Work2} \quad \text{Equation 4}$$

$$\text{Work 1} = \text{compressor and Work 2} = \text{expander}$$

$$8.33(3.31) = 1(34.5)$$

$$27.57(\text{Cubic meter})\ \text{PSI} < 34.5(1\ \text{Cubic meter})\ \text{PSI}$$

$$34.5(1\ \text{Cubic meter})\ \text{PSI} < 27.57(1\ \text{Cubic meter})\ \text{PSI} = 6.9(\text{Cubic meter})\ \text{PSI}.$$

The expander 370 has 6.9 (Cubic meter) PSI of surplus work available to operate the compressor 304. The surplus work overcomes the friction of compressor 304, 422 and expander 370, and allow the system to run, stand alone, or without the need of external augmented energy. The greater the surplus energy the greater the power and speed to run compressor 304,422.

The illustrations previously discussed are only examples and the principles may also apply to other applications and scenario utilizing different refrigerants, mechanical ratios, temperature and pressure parameters, etc.

Heat Containment System

Figure 6:
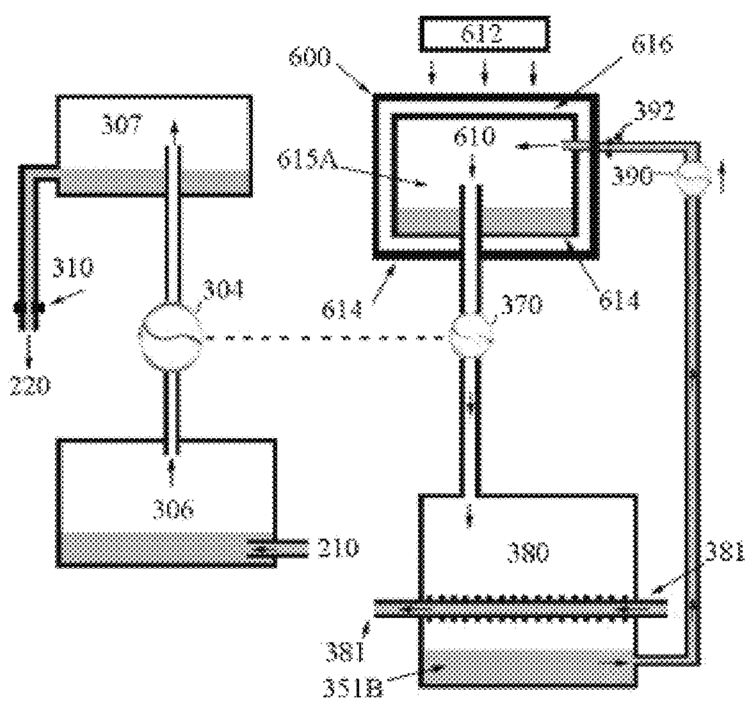
FIG. 6 illustrates a one way heat system, according to an aspect.

FIG. 6 illustrates a heat containment system 600 for the expansive section 600B of the distillation system.

Typically boilers that collect heat from un radiation lose heat to the environment through conduction. This embodiment helps prevent such loss. Sun rays from parabolic reflectors or mirrors 612 or the like penetrate the encasement 614, heating the boiler 610 of the expansive section 609 and causing the refrigerant 615A to boil Sun rays are electromagnetic radiation carving heat. And, since electromagnetic waves are not impeded bn a vacuum, heat may be transferred via radiation through vacuum layer 616 and both encasements 614 and heat the refrigerant 615A of boiler 610.

As radiant energy contracts the refrigerant 615A, its energy is transformed into kinetic energy and heats the refrigerant 615A. The heat in the form of kinetic energy contained in boiler 610 becomes trapped and unable to escape to the outside as the kinetic energy of the heated refrigerant 615 A molecules is unable to penetrate and pass the vacuum banner. The vacuum barrier 616 acts us a thermal insulator similar to that of a thermos. In utilizing this system, radiation energy is allowed to enter boiler 610 but the transformed kinetic energy, from the radiation, is prevented from escaping outside boiler 610. The heat containment system helps prevents heat loss to outside the boiler 610 and forces the energy to pass through expander 370 as useful work.

The encasement 614 may be composed of transparent materials, or other materials capable of allowing the penetration of radiation or sim rays. It is noted that some electromagnetic radiation may reflect and leave the system.

The energy derived from the expansive section 600B, utilizing the one way heat system 600 may be implemented as a power source to operate any of the pre-mentioned compressive sections 100, 300B. 400A and 600A.

FIG. 6 illustrates the one way heat system 600 used in conjunction with an expander 370 of the expansive section 6008B. The energy derived from the expansive section 600B is a power source for operating compressor 304. This embodiment, however, illustrates that the condenser 307 may be placed externally from evaporator 306 and not necessarily being limited to being placed within evaporator 306. In this situation the heat given off by condenser 307, including the heat of condensation, is absorbed by its environment rather than evaporator 306.

The one way heat system is not intended to be intended for use as described in this disclosure but may be useful in other applications such as the use of boilers to power steam generators or applications where it is desired to capture radiant energy and preclude kinetic energy from escaping.

Much of the heat utilized bl the system is recycled. As previously discussed, the heat recycling embodiments are summarized as follows:

1) Positioning condenser 410 within evaporator 425 causing latent heat to be given-off by condenser 410 and absorbed by the 425 evaporator.
2) Placing the condensing probe 140 deep into a tube containing the incoming seawater 152 causing heat to be absorbed by the seawater 142.
3) Utilizing a counter current heat exchange 200 for the transfer of heat from the hot condensed water 220 emitted from the condenser 135 and condensing probe 140 to the incoming seawater 210, such that most of the heat of the condensed water 220 is transferred to the incoming seawater 210.
4) Diverting low grade heat, in the form of condensed water 220, away from the counter current heat exchange 200 and delivering it into the boiler 360. The diverted low grade heat of the condensed water 220 conducts heat to the liquid-phase refrigerant R410-A 351A contained in boiler 360, causing the liquid refrigerant R410-A 351A it boil in the boiler 360, thus helping to power the expander 370.
5) Utilizing a pre-warming system to warm incoming seawater from the sea by transferring hear from the condenser 380 to the seawater before it enters the holding reservoir 230.
6) Placing the piped outflow and store containers 223 of condensed water 220 within the intake reservoir of the seawater, allowing the residual heat from the condensed seawater to transfer to the seawater in the holding reservoir 230.

Figure 7:
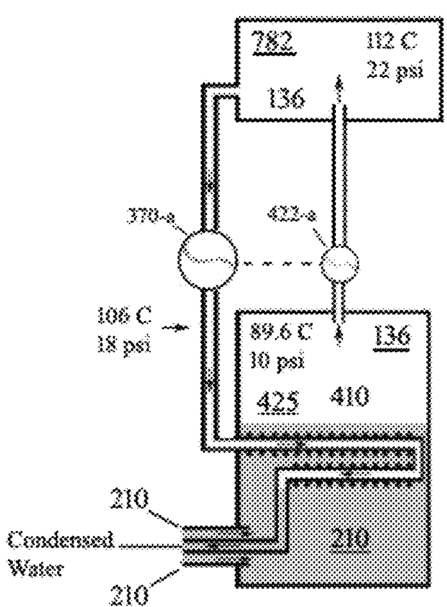
FIG. 7 illustrates a diagram of a distillation system with a mechanical advantage, wherein an expander displaces a greater volume of water vapor than the compressor connected to the expander, according to an aspect.

FIG. 7 illustrates a diagram of a distillation system with a mechanical advantage, wherein an expander displaces a greater volume of water vapor than the compressor connected to the expander, according to an aspect.

In further conservation of energy, the compressive portion of the system may be configured such that the compressor 422-*a* and a second expander 370-*a* are interconnected and transfer energy to one another. The expander 370-*a* may displace a greater volume of vapor 136 per revolution than the compressor 422-*a* does, producing a mechanical advantage system. The force exerted by the compressor 422-*a* and the expander 370-*a* may be in opposition and cancel each other out, resulting in the compressor 422-*a* and the expander 370-*a* to be in equilibrium.

In this configuration a pressured chamber may be created between the compressor 422-*a* and the expander 370-*a*, and may be referred to as a holding chamber 782. The compressor 422-*a* may be in fluid communication with the evaporator 425, and the expander 370-*a* may be in fluid communication with the condenser 410. Again, the expander 370-*a* may displace a greater volume of water vapor 136 than compressor 422-*a* does, creating a mechanical advantage system, wherein the pressure between the holding chamber 782 and condenser 410 is less than the pressure between die holding chamber 782 and evaporator 425. Thus, the difference in the temperature between the holding chamber 782 and condenser 410 may be less than the temperature between the holding chamber 782 and evaporator 425. In this manner the water vapor 136 entering condenser 410 may be at a higher temperature than that of the seawater 211 entering evaporator 425, causing a transfer of heat from condenser 410 to evaporator 425 and resulting in the seawater 211 in evaporator 425 to boil and the water vapor in condenser 410 to condense.

In order to maintain the temperature pressure in the respective chambers, it is important to prevent the loss of hent to avoid disruption of the system. Hence, the respective chamber and interconnecting components should preferably be well insulated, such as, for example, by a vacuumed encasement.

The following chart lists examples of pressure and temperature in the respective chambers:

Chart 4
Water

| | | |
|---|---|---|
| Holding Chamber: | Temperature 112 C. | Pressure 22 psi (denoted by P1 and P3) |
| Evaporator: | Temperature 89.6 C. | Preasure 10 psi (denoted by P2) |
| Condenser: | Temperature 106 C. | Pressure 18 psi (denoted by P4) |

The system in equilibrium is shown by the following equation:

$$V1(P1-P2)=V2(P3-P4) \quad \text{Equation 5}$$

If V2 or volume displaced by compressor 410=1 Cubic meter

Expansive Compressive (V1)(22 − 18) psi = 1 Cubic meter)(22 − 10) psi.

(V1)(4) psi = 12 (Cubic meter) psi

V1 = 3 Cubic meter

As an example, for the system to be at equilibrium. V1, the volume of the expander 370-*a*, must displace 3 cubic meters of volume per revolution while V2, the volume of the compressor 422-*a*, must displace 1 square meter of volume per revolution. In using the example pressure and temperature parameters listed in Chart 4, the expander 370-*a* must displace a volume of vapor treater than 3 cubic meters in order for the compressor 422-*a* to be capable of compressing vapor from evaporator 425 into the holding chamber, 782. Additionally, a difference less than 12 psi. (which corresponds to a difference in temperature of 22.4 degrees C., between the holding chamber 782 and the evaporator 425 is required for compressor 422-*a* to be capable of compressing vapor front evaporator 425 into the holding chamber 792. The compressor 422-*a* and/or expander 370-*a* may be equipped with, for example, a variable size drive pulley or other suitable means for controlling the pressure/temperature in the holding chamber 782.

It is noted that the major principles (f recycling heat are generally described herein and that there ma exist variants or deviations that produce an equivalent outcome. It is the purpose of the present invention to encompass these variations. All embodiments may be implemented solely or in conjunction with any combination with one another thereof.

As an example, when the system is at equilibrium, it is in a static state. The system may remain at equilibrium provided there is no displacement of vapor by either compressor 422-*a* or expander 370-*a* and no heat transfer from either of the chambers occur. However, in a dynamic state, expander 370-*a* may displace a greater volume of vapor than compressor 422-*a* does. Hence, compressor 422-*a* may be incapable of replenishing the volume of vapor into the holding chamber 782 in relation to the amount that is being drawn by expander 370-*a*. Consequently, the holding chamber 782 may quickly lose pressure and the mechanical advantage system may become disrupted.

Additionally, the density of water vapor is less at lower temperatures than it is at higher temperatures. As an example, if the temperature of evaporator 425 is lower than that of the temperature of the holding chamber 782, the density of water vapor in evaporator 425 is less than that of the holding chamber 782. Hence, again expander 370-*a* is expelling a greater quantity of vapor from the holding chamber 782 at compared to the amount of vapor aspirating from evaporator 425 and compressed into the holding chamber 782. Again, the holding chamber 782 locs pressure and the mechanical advantage system becomes disrupted in this example.

Figure 8:
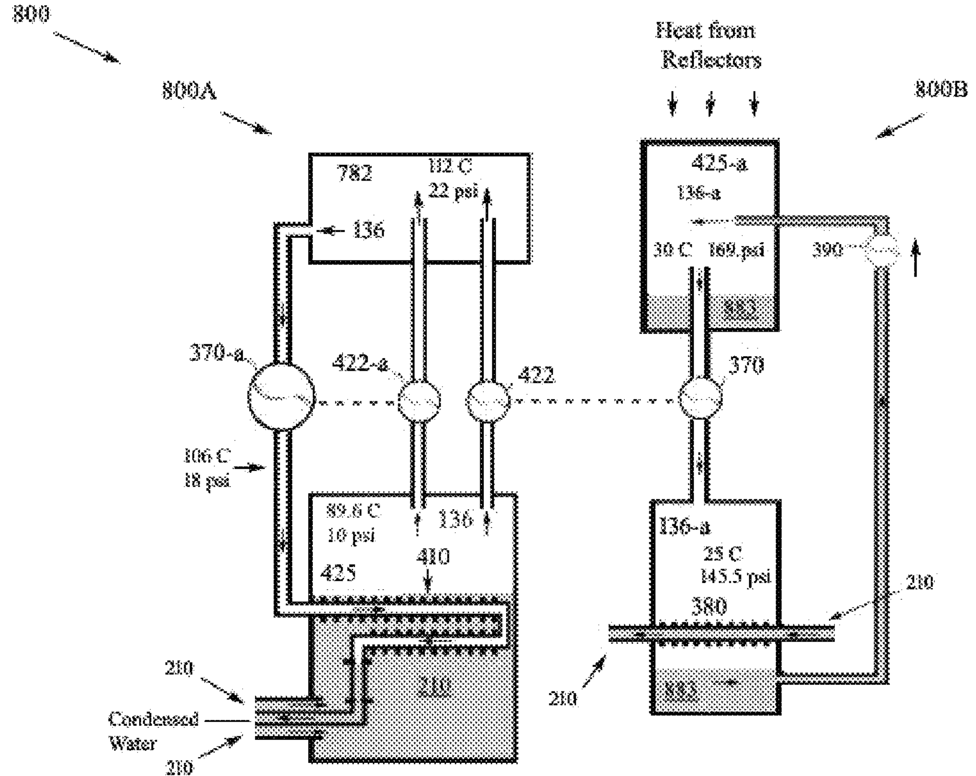
FIG. 8 illustrates a diagram of a distillation system having a chemical mechanical advantage system, according to an aspect.

FIG. 8 illustrates a diagram of a distillation stem having a chemical mechanical advantage system, according to an aspect.

To compensate for the depletion of water vapor 136 in the holding chamber 782, additional vapor must preferably be aspirated from evaporator 425 and Compressed into die holding chamber 782. To achieve this a first compressor 422 may be configured between the first evaporator 425 and the holding chamber 782 and the vapor from first evaporator 425 ("first evaporator" or "evaporator 1") may be compressed into the holding chamber 782. The first compressor 422 ("first compressor" or "compressor 1") may be coupled to and powered by a first expander 370 of expansive suction 800B "expansive section," "expansive portion," "expansion section," or "expansion portion"). In this example, the expansive section 800B contains ammonia ($NH_3$) 883. As explained previously, the expander 370 may derive its energy from the difference in pressure between the second evaporator 425-*a* ("second evaporator" or "evaporator 2") and the second condenser 380, and their is an increase in pressure as the $NH_3$ liquid 883 boils in the second evaporator 425-*a* and a decrease in pressure as the $NH_3$ vapor 134-*a* condenses in the second condenser 380. The expansive section 800B may be fortified by, for example, solar energy applied to evaporator 425-*a* or replaced or augmented by a motor to either the first compressor 422 or first expander 370.

Further, the vapor 136 from the first evaporator 425 must preferably be compressed and stepped up to a pressure level that reaches at least the pressure of that of the holding chamber 782. The step up mechanism may be accomplished by the implementation of the first expander 370 of expansive section 800B in which expansive section 800 contains a fluid having different vapor pressure properties than that of water. This step up mechanism may be referred to as a chemical mechanical advantage system.

A shown in FIG. 8, in the system 800, water vapor is compressed from the first evaporator 425 into the holding chamber 782. In this example the system is driven by expansion section 800B and utilizes ammonia ($NH_3$) 883 as its fluid $NH_3$ has different vapor properties than water. The difference in vapor properties may produce a chemical type mechanical advantage.

As an example, heat for the second evaporator 425-*a* is provided by solar heat and is heated to 30 C and the second condenser 380 ("second condenser" or "condenser 2") is cooled by sea water 210 at a temperature of 25 C. The temperature differential between the second evaporator 425-*a* and second condenser 380 drives the first expander 370 which in turn drives the first compressor 422, to which the first expander 370 is connected.

Chart 5 lists the parameters for equilibrium when using $H_2O$ in die compressive portion 800A of the system and $NH_3$ in the expansive portion 800B of the system.

Chart 5

| Compressive Section H2O | | |
|---|---|---|
| Holding Chamber: | Temperature 112° C. | Pressure 22 psi (denoted by P1) |
| Evaporator 1: | Temperature 89.6° C. | Pressure 10 psi (denoted by P2) |

| Expansive Section NH3 | | |
|---|---|---|
| Evaporator 2: | Temperature 30° C. | Pressure 169.1 psi (denoted by P3) |
| Condenser 2: | Temperature 25° C. | Pressure 145.5 psi (denoted by P4) |

Below is the derivation for the parameters shown in chart 5 using the following equation:

$$V1(P1-P2)=V2(P3-P4) \quad \text{Equation 6}$$

If V1 or volume displaced by compressor 1=1 cubic meter $$1\ \textit{cubic meter}(22-10)\ \text{psi}=(V2)(169.1-145.5)\ \text{psi}$$

$$(12)\ (\text{cubic meter})\ \text{psi}=(V2)23.6\ \text{psi}$$

$$.508(\text{cubic meter})=V2$$

For the system to bx at equilibrium. V2 or expander 1 must displace 0.508 cubic meter of volume per revolution while V1 or compressor 1 must displace 1 meter sq. of volume per revolution. In using the above pressure and temperature parameters listed in chart 5, expander 1 must displace a volume of vapor greater than 0.509 in order for compressor 1 to be capable of compressing vapor from evaporator 1 into the holding chamber.

Conversely, if V2 or volume displaced by expander 1=1 cubic meter then:

$$(V1)(12)\ \text{psi}=(1\ \text{cubic meter})\ 23.6\ \text{psi}$$

$$\text{V1}=1.96\ (\text{cubic meter})$$

Compressor 1 must displace a volume of vapor less than 1.9 in order for compressor 1 to be capable of compressing vapor from evaporator 1 into the holding chamber.

Additionally, a difference greater than 23.6 psi, (which corresponds to a difference in temperature of 5 degrees C.), between evaporator 2 and condenser 2 is required tor compressor 1 to be capable of compressing vapor from evaporator 1 into the holding chamber. The heat differential may be obtained by heating evaporator 2 with a heating source such as implementing parabolic reflectors and, or, in the condensing side, introducing a cooling source into condenser 2 in the form of piped cool seawater.

It is noted that only a difference greater than 5 degrees C. between evaporator 2 and condenser 2 are required to compress vapor from condenser 1 into the holding chamber having a difference of temperature of 22.4 degrees C.

A pump may be necessary to pump the condensed liquid $NH_3$ from the low pressure second condenser 380 to the high pressure evaporator 425-*a*. Regulators (984 in FIG. 9) may be placed where needed within the system. The regulator may, for example, be in the form of pumps, one way valve, or release valve in order to maintain proper pressure to make the system functional.

Figure 9:
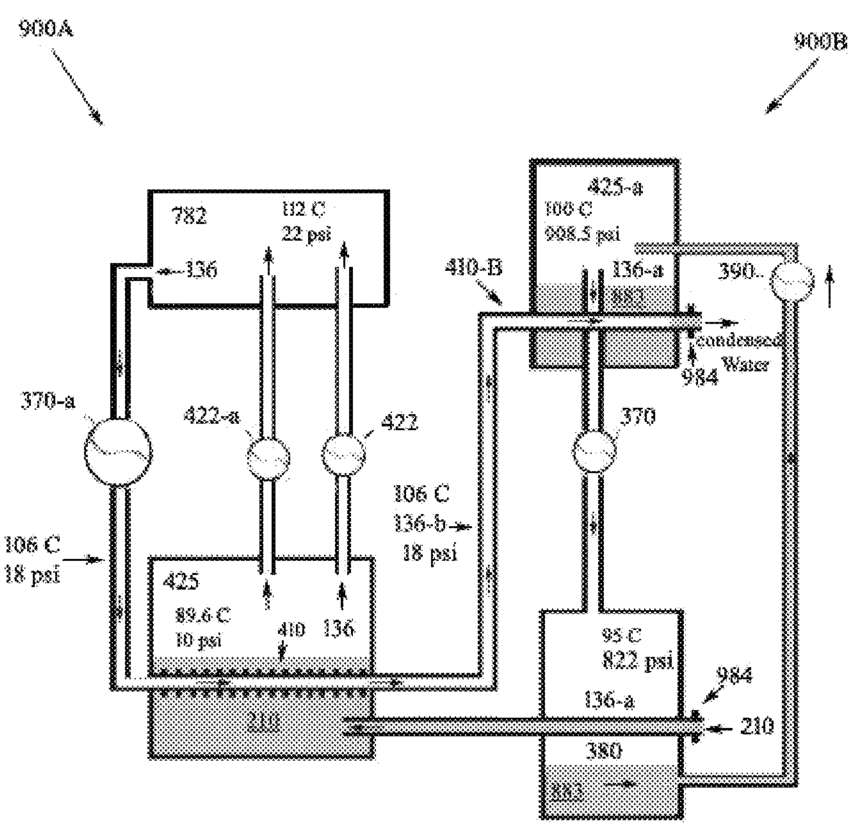
FIG. 9 illustrates a diagram of a distillation system in which excess vapor expelled from condenser 410 is directed to a condenser and into an evaporator, according to an aspect

FIG. 9 illustrates a diagram of a distillation system in which excess vapor expelled frum condenser 410 is directed to condenser 410-B and into, evaporator 425-*a*, according to an aspect.

In the previous example, the second evaporator 425-*a* is primarily solar driven by the expansion section 800M. However in another example, the excess vapor 136, not condensed by the first condenser 4110, is directed into the second evaporator 425-*a*. The thermal energy from the vapor 116 directed from condenser 410, becomes recycled and drives or helps drive expander 370 and in turn drives the first compressor 422

FIG. 9 depicts an example where the excess vapor that ha-not been condensed in condenser 410 is delivered to condenser 410-B contained in evaporator 425-*a* of the expansive section 900B. Additionally, the hot water that has been condensed in condenser 410 is also delivered to condenser 410-1 located within evaporator 425-*a*. The energy derived from the heat of the vapor or the mixture of vapor and/or condensate 136-*b* causes the $NH_3$ 983 to boil in evaporator 425-*a* causing an increase in pressure in evaporator 425-*a* and, simultaneously, as the $NH_3$ vapor 136-*a* condenses in condenser 380, expander 370 becomes actuated. Hence, the energy is recycled back, driving expander 370 and in turn compressor 422. In this manner the energy from the excess vapor and hot condensate that is emitted from condenser 410 is ultimately transformed and used to compress vapor from evaporator 425 into the holding chamber 782.

Further, heat given off by condenser 380 to the incoming piped cool seawater 210 may be redirected back and pre-heats the seawater 210 entering evaporator 425. The recycling of heat, anywhere possible, helps in conserving energy.

The expansive system, again may be part of a step up system and may utilize $NH_3$ as the second fluid. As previously discussed, the second fluid having different vapor pressure properties than that of water, produce a chemical type mechanical advantage.

As illustrated in FIG. 9, expander 370 may be configured between evaporator 425-*a* and condenser 380 and the energy derived, from the difference in temperature between evaporator 425-*a* and condenser 380, is delivered to expander 370 and is leveraged mid stepped up and in turn transferred onto compressor 422. Compressor 422 subsequently aspirates vapor and induces boiling of the seawater in evaporator 425 and compresses the vapor to a pressure and temperature equal to or above that of the holding chamber 782.

Pumps may be implemented, where needed, to regulate the length of time the vapor/seawater 136-*b* are transferring heat to their respective components. The regulating pumps, in the form of pumps or release valves, assure that the proper temperatures and pressures within the system are maintained.

Chart 6 lists the parameters for equilibrium using $H_2O$ for the compressive portion of the system and $NH_3$ in the expansive portion of the system.

Chart 6

| Compressive H2O | | |
|---|---|---|
| Holding Chamber: | Temperature 112° C. | Pressure 22 psi (denoted by P1) |
| Evaporator 1: | Temperature 89.6° C. | Pressure 10 psi (denoted by P2) |

| Expansive NH3 | | |
|---|---|---|
| Condenser: | Temperature 100° C. | Pressure 908.5 psi (denoted by P3) |
| Evaporator 1: | Temperature 95° C. | Pressure 822.2 psi (denoted by P4) |

Below is the derivation for the example parameters shown in chart 5 using the following equation:

$$\textit{Compressive}\ \text{H2O}\ \ \text{Expansive NH3} \quad \text{Equation 7}$$

$$V1(P1-P2)=V2(P3-P4)$$

If V1 or volume displaced by compressor 1=1 cubic meter

Thus:

$$\text{Compressor 1} \quad \text{Expander 1}$$

$$1 \text{ cubic meter}(22-10) \text{ psi} = (V2)(908.5-822.2) \text{ psi.}$$

$$(12) \text{ (cubic meter) psi} = (V2)86.3 \text{ psi}$$

$$0.134(\text{cubic meter}) = V2$$

For the system to be at equilibrium. V2 or expander 370 (expander 1) must displace 0.134 meter sq. of volume per revolution while V1 or compressor 422 (compressor 1) must displace 1 meter sq. of volume per revolution.

In using the above pressure and temperature parameter in the example listed in chart 6, expander 370 must displace a volume of vapor greater than 0.134 in order for compressor 422 (compressor 1) to be capable of compressing vapor from evaporator 425 into the holding chamber 782.

Additionally, a temperature difference greater than 86.3 psi. (which corresponds to a difference of in temperature of 5 degree. C), between evaporator 425-*a* and condenser 380 is required tor compressor 422 to be capable of compressing vapor from evaporator 425 into the holding chamber 782.

The incoming seawater absorbs heat from the condensing $NH_3$ of condenser 380 and is directed to evaporator 425. Additional external heat may be applied as needed at any point within the system.

The outgoing condensate and the incoming seawater are subsequently entered into a counter current heat exchange system as previously, illustrated in FIG. 2. Alternatively, the condensate may transfers its residual heat to the incoming seawater as it passes through a counter current latent heat exchange system (described in the next section).

The stepped up mechanism may also be achieved with the use of water as the second fluid as opposed to $NH_3$. However, the stepped up mechanism in this example is produced by conventional mechanical advantage in contrast to being produced by chemically induced mechanical advantage. The size of expander 370 would need to be increased to displace a greater volume of vapor than does compressor 422.

It should be understood that the illustrations previously discussed are only examples and the principles shown herein may also apply to other scenarios and applications using different fluids, mechanical ratios, temperature and pressure parameters, and so on.

Figure 10:
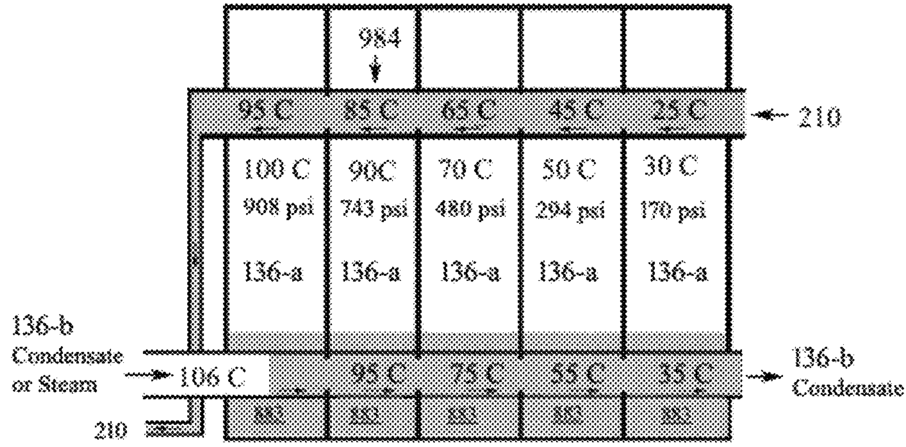
FIG. 10 illustrates a diagram of a distillation system having a counter current heat exchange system that transfers heat through latent heat, according to an aspect

FIG. 10 illustrates a diagram of a distillation system having a counter current heat exchange system that transfers heat through latent heat, according to an aspect.

The previously discussed counter current heat exchange system, described when referring to FIG. 2, may transfer heat by conduction without the use of latent heat. As an example, the following counter current heat exchange system transfers heat through the exchange of latent heat. The advantage of transferring heat through latent heat of vaporization and condensation is that it is a much more rapid process for transferring heat as compared to the transfer of heat by general conducton. In this example, this is possible, in that the available heat for transfer in latent beat of vaporization or condensation of water at 100 degrees C., is approximately 540 cal/g; thus, this provides a much more rapid process for transferring heat.

As an example, the hot vapor/steam and or condensate 136-*b* emerging from condenser 410 and 410-H of FIG. 4 are passed through a thermal conductive conduit that is submerged in a liquid fluid. FIG. 10. In this example the liquid is $NH_3$ 883. However, any fluid may be used, including water. The heat from the steam and/or condensate 136-*b* conducts through the conduit, causing the liquid $NH_3$ 883 to boil and in the process absorbs latent heat. Above the boiling $NH_3$ a second conduit is positioned and transports cool seawater 210 in an opposite direction of that of the steam and/or condensate 136-*b*. As the vapor 136-*a* from the boiling $NH_3$ liquid rises it makes contact with the conduit carrying the cooler incoming seawater 210 causing the vapor 136-*a* to condense and fall back into the liquid $NH_3$ 888. As the $NH_3$ vapor 136-*a* condenses, its laten heat is transferred to the seawater 210.

The conduit carrying the hot condensate may act in part as a boiler or evaporator and the conduit carrying the cold seawater may act as a condenser.

To make the system effective, the counter current latent heat system may be compartmented in a sense of compartments or ells. The compartmented cells may be segmentally enclosed and each cell may contain a liquid and vapor mixture of $NH_3$ and a segmented portion of the conduit containing cool seawater 210 (traveling in one direction), and below a second conduit containing hot condensate 136-*b*. (traveling in the opposite direction), as the process of the $NH_3$ vaporizing and condensing proceeds, heat exchange may occur between the conduit carrying the hot outgoing condensed water 136-*b* and the cool incoming seawater 210 as illustrated in FIG. 10. As an example, as the respective fluids within each conduit enters each succeeding cell, the temperatures of the condensate 136-*h* gradually decrease and the temperature of the seawater 210 increases. At the hot and the cold ends of the system, the condensate and the seawater should have close to the same temperature of one another. This principle may also apply to other applications where heat exchange from one fluid to another is desired. The hot fluid may be a vapor and or a liquid and exchange heat with a second fluid that may be a vapor and or a liquid.

The pressures of each compartment within the series may be regulated to support the process of boiling and condensing of the $NH_3$ relative to the temperature of the paired off incoming seawater 210 and outgoing condensate 136-*b*. Preferably, the temperature and corresponding pressure within each of the respective compartment should be approximately the average of the temperature of the respective portion of the piped outgoing condensate 136-*b* and the incoming sweater 210 within the particular compartment. Also, one-way valves 984, in both the hot and cold conduits, may be placed between each compartment or where needed, to avoid backflow of fluid and help keep the temperatures of each compartment segregated in this manner the temperature of the outgoing condensate 136-*b* is hotter than the liquid $NH_3$ 883, (causing the liquid $NH_3$ to boil) and conversely the temperature of the incoming seawater 210 is cooler than the $NH_3$ to vapor 136-*a*, causing the $NH_3$ vapor 136-*a* to condense and precipitate to the bottom of the compartment. In another fluid other than $NH_3$ is used for example water, the suitable parameters of temperature and pressure within each cell must be appropriately adjusted.

Figure 11:
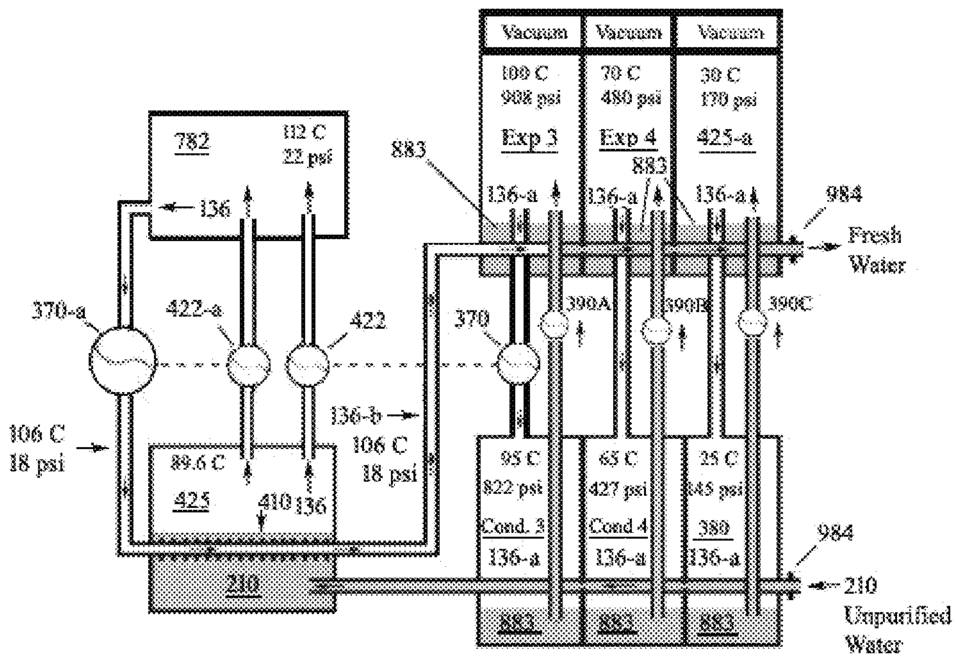
FIG. 11 illustrates a diagram of a distillation system utilizing a combination of the stepped up system using chemical mechanical advantage, and a counter current latent heat exchange system, according to an aspect.

FIG. 11 illustrates a diagram of a distillation system utilizing a combination of the stepped up system using chemical mechanical advantage (us previously described in FIG. 9), and a counter current latent heat exchange system (as previously described in FIG. 10), according to an aspect.

The advantage of combining the two systems is that first, the capability of leveraging and compressing the vapor from evaporator 425 into the holding chamber 782 is provided, and secondly, the use of latent heat of vaporization and condensation provides for a much more rapid process for transferring heat through the counter current heat exchange system.

In this example the series of evaporator (Evp 3, Evp 4, 425-*a*) and condensers (380, Cond 4, Cond 3) contain $NH_3$. The conduit carrying the hot condensate or vapor 136-*b* is passed through each successive compartment within the series of evaporators (Evp 3, Evp 4, 425-*a*). Conversely, the conduit carrying the cool sweater 210. (in the opposite direction), is passed through each successive compartment within the series of condenser, (380, Cond 4, Cond 3). The conduit carrying the hot condensate is located above the conduit carrying the cold seawater 210. Again, the hot condensate 136-*b* and cold seawater 210 travel in opposite directions within their respective conduit, and, in each cell, the conduit carrying the hot condensed 136-*b* gives off heat and causes boiling of the $NH_3$ within its respective evaporator. (Exp 3, Evp 4, 425-*a*) and the conduit carrying the cold seawater 210 absorbs heat from the $NH_3$ Vapor 136-*a* within its respective condensers (Cond 3, Cond 4 and 380). The vapor 136-*a* produced by (Evp 3, Evp 4. 425-*a*) is communicated and condensed by condensers Cond 3, Cond 4 and 380) respectively. Expander 370 is configured between Evp 3 and Cond 3 and may drive compressor 422. Its energy is derived from the difference in pressure of evaporation Evap 3 and condenser Cond 3 mid may serve as a step up system using chemically induced mechanical advantage.

Pumps (390A, 390B, 390C) may be necessary to pump the precipitated liquid $NH_3$ from each of the respective low pressure condensers (Cond 3, Cond 4, 380) to its paired high pressure evaporator in each cell. One-way valves may be placed where needed, to help keep each compartment thermally segregated within the system. Regulators 984 may also, for example, be in the form of pumps or release valves in order to maintain proper pressure to make the system functional.

The evaporator of any of the compartments of the system may be fortified by the implementation of heat, either provided by solar parabolic reflectors or other means. The illustration in FIG. 11 depicts 3 compartments containing evaporator, (Evp 3, Evp 4, 425-*a*) as well aw their respective expanders and condensers. However, the use of a greater number of chambers provides for a more gradual temperate gradient between the incoming sweater and condensate and improves the efficiency of the system.

The series of compartmentalised evaporators (Evp 3, Evp 4, 425-*a*) may be encased with a vacuumed one-way heat system. As previous discussed, heat from sun rays reflected from parabolic reflectors or the like penetrate the glass encasement, contributing heat to the series of evaporators (Evp 3, Evp 4, 425-*a*) causing the $NH_3$ 883 refrigerant to boil. Sun rays are electromagnetic radiation carrying heat. Again, as previously discussed since electromagnetic waves are not impeded by a vacuum, heat can be transferred through a vacuum via radiation. The heat in the evaporators becomes trapped and unable to escape to the outside ai the kinetic energy of the refrigerant molecules are unable do penetrate and pass the vacuum harrier. This configuration ma, become a heat trap per se.

The system may be composed of numerous cells to assure a gradually heat exchanged between the condensate 136-*b* to the incoming seawater 210. In the process heat is given off from the condensate to the incoming seawater and simultaneously the temperature of the incoming seawater gradually increases as it absorbs heat from the condensate. As the respective fluids within each conduit enters each succeeding cell, the temperatures of the condensate 136-*b* gradually decrease and the temperature of the seawater 210 increases. At the hot and the cold ends of the system, the condensate and the seawater should have close to the same temperature of one another.

Figure 12:
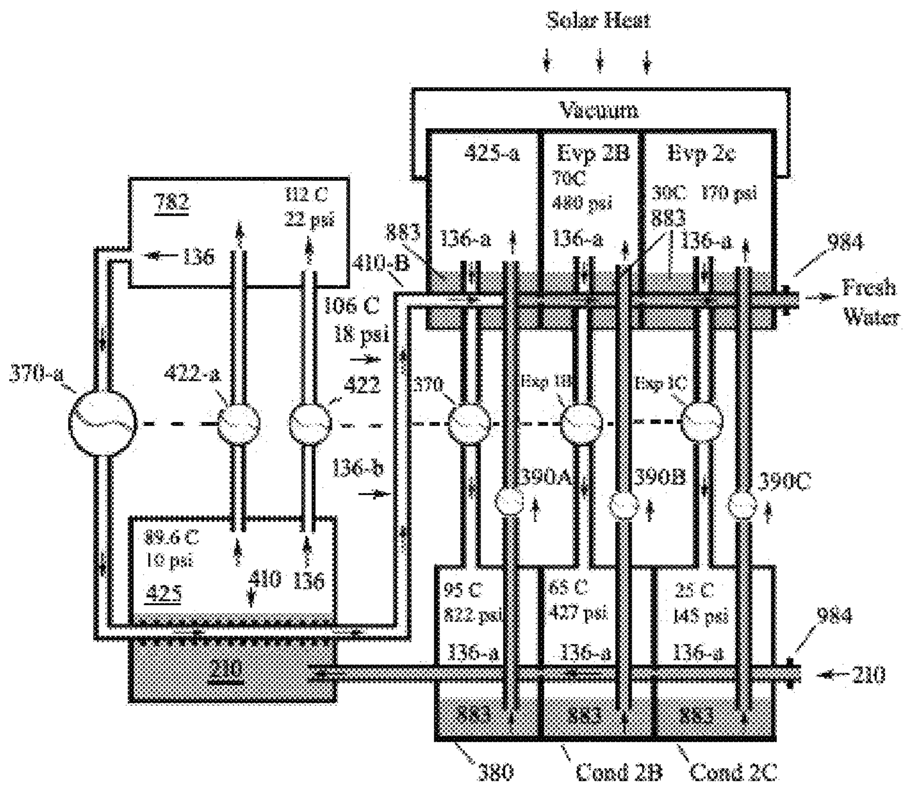
FIG. 12 illustrates a diagram of a distillation system having cells, wherein each cell contains its own evaporator, condenser and expander, and, also has incorporated the counter current latent heat exchange system, according to an aspect.

FIG. 12 illustrates a diagram of a distillation system having cells, wherein each cell contains its own evaporator, condenser and expander, in which the are configured and function similar to that described in the segmented cell constraining the paired Evp 3 and Cond 3 of FIG. 11, and, also has incorporated the counter current latent heat exchange system as previously discussed in FIG. 9 and FIG. 11) according to an aspect.

The expanders are depicted as 370, Exp. 1B and Exp. 1C, and may be in communication with their respective evaporator and condenser. Each cell function as an independent unit. However, the expanders of each cell may be interconnected in series and may be configured to function cumulatively. Each expander within each cell may serve as a step up system using chemically induced mechanical advantage energy derived from the difference in pressure of its respective evaporator (425-*a*, Evp 2, Evp 2C) and condenser (380, Cond 2B, Cond 2C) and the energy derived from each cell is delivered to their respective expander and summed together and transmitted to power compressor 422. Again pumps (390A, 340B, 390C) may be necessary to pump the precipitated liquid $NH_3$ front the respective low pressure condenser to the high pressure evaporator in each cell. Regulators 994 in the form of pumps or release valves as well as one-way valves may be used to maintain proper function of the system, and, the series of compartmentalized evaporators (425-*a*, Evp 2B, Evp 2C), may be encased with a vacuumed once-way heat system.

This example utilizes $NH_3$ as the step up fluid. However, other fluids may be used including water. However, with each fluid, suitable parameters with regard to temperature and pressure must be appropriately adjusted and maintained within each cell in order for the system to function.

In the case of using water as opposed to $NH_3$, the stepped up mechanism is produced by conventional mechanical advantage in contrast to being produced by chemically induced mechanical advantage. The expander in the series of cells cumulatively sum together to displace a greater volume of vapor tian does compressor 422, resulting in a conventional mechanical advantage, as described in FIG. 13.

Figure 13:
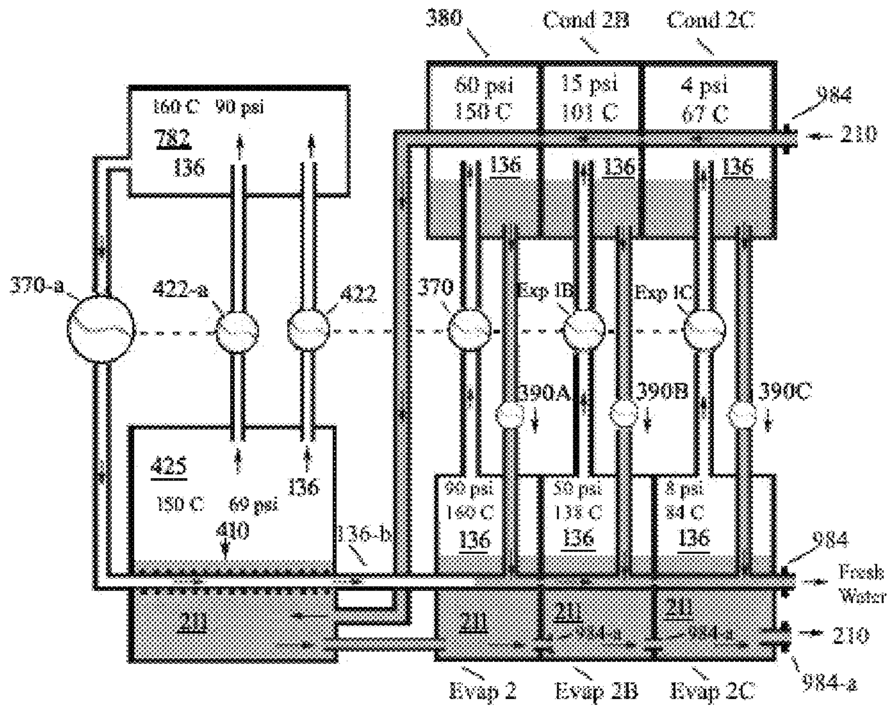
FIG. 13 illustrates a diagram of a distillation system having a counter current latent heat exchange system using solely water, according to an aspect.

FIG. 13 illustrates a diagram of a distillation system having a counter current latent heat exchange system using solely water, according to an aspect. This is considered when the use of $NH_3$ is not desired. In this example water itself is used.

As an example, heated brine 211 from evaporator 425 is conveyed through a series of evaporator cells (Evap 2, Evap 2B, Evap 2C). Additionally, condensate and/or steam 136-*b*, from condenser 410, is concurrently transport though a conduit through the same series of evaporator cells. The heat from the steam and condensate 136-*b* is absorbed by the seawater brine 211 of each evaporator cell causing the seawater brine 211 to boil. The pressure and temperature within each respective evaporator cell is such that the brine within each cell boils. As the brine progresses through the evaporators of each successive cell via regulating pumps 984-*a*, the temperature of the brine may become lower as heat is given off to the evaporator of each cell. Simultaneously, die salt content may become more concentrated as more and more of the brine boils oil.

Concurrently, at the opposite end of the counter current latent heat exchange system, seawater 210 of lower temperature is introduced into the series of condensers (Cond 2C, Cond 2B. 380). Thae seawater 210 flows through a conduit and is configured to flow through the series of condensers in the opposite direction of the condensate 136-*b* that flows through the series of evaporator. As the seawater progresses through the condenser of each successive cell, heat is absorbed from the surrounding water vapor 136, (that has been created by the boiling of brine in its respective evaporator). Consequently, the temperature of the incoming seawater 210 progressively becomes greater. As the water vapor 136 comes in contact with the cooler piped seawater 210, it condenses and precipitates to the button of its respective condenser and is subsequently pumped to and joins the condensate 134-*b*. In this manner the heat remaining in the precipitated water vapor is used again in the successive evaporators.

Similar to the system described n FIG. 12, the expanders are depicted as 370, Exp 1 B and Exp. 1C, and may be in communication and located between their respective evaporator and condenser within the series. Each cell malfunction as an independent unit. Energy derived from the difference in pressure of the boiling brine 211 of the evaporators and the condensing of vapor 136 within the condenser in each cell, may be transferred to their respective evaporator. Because the expanders are interconnected in series, the energy of the expanders (370, Exp. 1B and Exp. 1C), may function cumulatively and sum together. The resulting summation of energy in turn may be transmitted to power compressor 422. The expanders when arranged in series, cumulatively displace a greater volume of vapor 136 than does compressor 42, resulting in a conventional mechanical advantage and stepped up mechanism.

Again pumps (390A, 390B, 390C) may be necessary to pump the precipitated liquid from the respective low pressure condenser to the high pressure evaporator in each cell. Regulators 984 and 984-*a* in the form of pump, or release valves as well as one-way valves may be used at maintain proper function of the system.

Alternatively, the energy generated by each expander within each cell, may be coupled to mad transferred to a separate and designated compressor placed between evaporator 425 and the holding chamber 782. This configuration would result in a plurality of compressors, located within evaporator 425, being coupled to a designated expander within the series of cells. This is in contrast to the series of evaporators being coupled to a single compressor located within evaporator 425.

Figure 14:
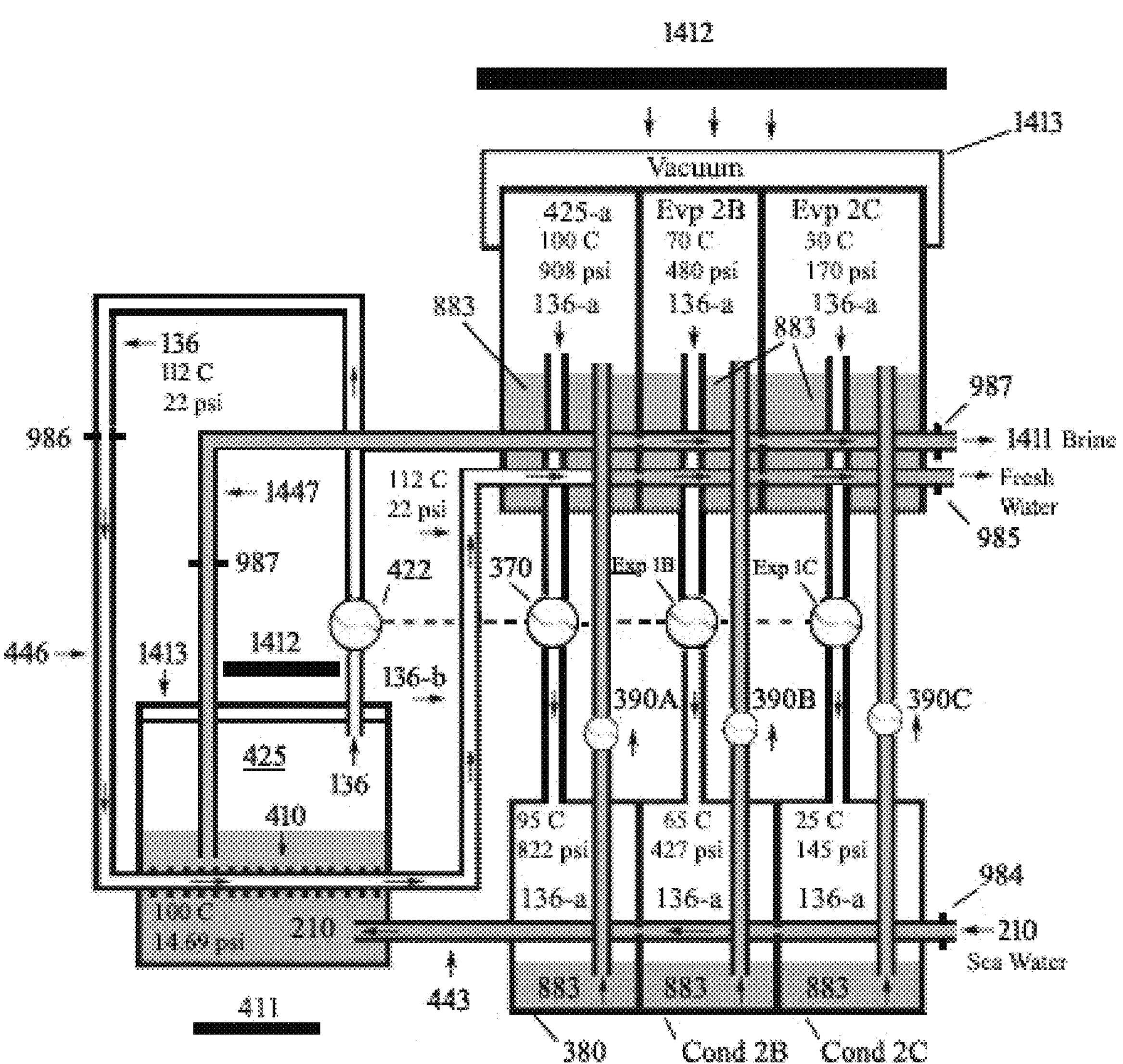
FIG. 14 illustrates a diagram of a distillation system having at plurality of expanders interconnected and contributing energy to power a compressor, and, also has incorporated a conduit transporting brine frum an evaporator and recycling its heat back into the system, according to an aspect FIG. 15. illustrates vapor from an evaporator being compressed by a compressor and directly transported through a series of evaporators.

FIG. 14 illustrates a diagram of a distillation system according to an aspect.

Similar to the distillation system depicted in FIG. 12, FIG. 14 depicts a distillation system configured having a plurality of expanders (370, Exp. 1B, Exp 1C) interconnected and contributing energy to power compressor 422. However, in illustration FIG. 14 compressor 422-*a* and expander 370-*a* (depicted in FIG. 12 are eliminated such that the plurality of interconnected expanders directly power compressor 422. Many of the elements discussed in FIG. 12 as well as other elements discussed in previous illustrations are not depicted here in order to avoid redundancies.

The energy provided by expanders (370, Exp. 1B, Exp. 1C) cumulatively power compressor 422. Compressor 422 draw, vapor 136 from the wea % ater 210 contained in evaporator 425 and compresses it into condenser 410.

A previously illustrated in FIG. 12, the conduit carrying the compressed vapor 136 and the condensate of vapor 136 is passed from condenser 410 through each successive compartment within the series of evaporators (425-*a*, Evap. 2b, Evap. 2*c*) and as it pass through, heat is given off to each successive evaporator thus contributing heat to liquid 883 in each respective evaporator. Also, seawater 210 of boiler temperature is introduced into the series of condensers (Cond 2C, Cond 2B. 380). The seawater 210 flows through a conduit 443 and is configured to flow through the series of condenser, in the opposite direction of the condensate 136-*b* that flows through the series of evaporators. As the seawater progresses through the condenser of each successive cell, heat is absorbed from the surrounding vapor 136-*a*. (that has been created by the boiling of liquid 433 in its respective evaporator. (Consequently, the temperature of the incoming seawater 210 progressively becomes greater. As the vapor 136-*a* comes in contact with the cooler piped seawater 210, it condenses and precipitates to the button of its respective condenser.

Alternatively and depending on the application, conduit 446 or conduit 1447 need not pass through each successive evaporator (425-*a*, Evap. 2b, Evap. 2c), in which heat is given off to liquid 883 contained in each evaporator. Also, conduit 446 need not pass through each successive condenser (Cond 2C, Cond 2, 380), wherein heat is, absorbed by vapor 136-*a* in each condenser and causing vapor 136-*a* to condense. In this situation, evaporator (425-*a*, Evap. 2b, Evap. 2c) may have its own heating source. Likewise, condensers (Cond 2C, Cond 2B, 380) may have its own cooling source.

A one-way valve 986 may be implemented, having a regulating pressure release mechanism, impeding the flow of vapor 136 and releasing pressure at a predetermined higher level into condenser 410. The increased pressure level is designed to increase the temperature of vapor 136 being transported by conduit 146 thru condenser 410. The increased temperature of vapor 136 contained in condenser 41), having a higher temperature than the seawater 210 contained in evaporator 425 caused the bailing of seawater 210.

The pressure release mechanism of one-way valve 986 regulates and controls the pressure and thus the temperature of vapor 136 emitted and leading into condenser 410. By monitoring the pressure of vapor 136 released into condenser 410, the rate at which the seawater 410 boils is regulated.

As previously discussed, mechanical advantage is produced when the volume of expander 370 displaces a greater volume of vapor than that displaced by condenser 422. This is consistent with equation 5.

Compressive Expansive $$V1(P1-P2)=V2(P3-P4)$$

In this embodiment, similar principles of mechanical advantage are observed as previously illustrated with equation 5, in this illustration, the increased volume is achieved by using multiple interconnected expanders. For example, expanders (370, Exp 1B, Exp. 1C) are interconnected and the energy produced by each expander is summed together to cumulatively power condenser 422. In this situation, the volume displaced by each expander is multiplied by the pressure difference between the evaporator and condenser within each respective compartment of the series. The energy produced by each expander becomes combined to result in a cumulative force acting on compressor 422.

Thus $$V1(P1-P2)=V2(P3-P4)-V3(P5-P6)+V4(P7-P8)\ \ldots,\ \text{etc.} \qquad \text{equation 8:}$$

Where: the pressure evaporators in (425-*a*, Evap 2B, Evap 2C) equals (P3, P5, P7) respectfully and where the pressure in condensers (380, Cond 2B, Cond 2C) equal. (P3, P5, P7) respectfully and where P1 equals the pressure in evaporator 425 and P2 equals the pressure in condenser 410

Where: V2 (P3-P4) is the energy derived from the first cell of the series.

V3 (P5-P6) is the energy derived from the second cell of the series.

V4 (P7-P8) is the energy derived from the third cell of the series.

In which V1(P1-P2) is the work done by compressor 122. And

V2 is the volume displaced by expander 307 and (P3-P4) is the pressure differential acting on expander 307.

V3 is the volume displaced by expander Exp. 1B and (P5-P6) is the pressure differential acting on expander Exp. 1B.

V4 is the volume displaced by expander Exp. 1C and (P7-P8) is the pressure differential acting on expander Exp. 1C.

As previously discussed in previous embodiments, liquid 210 and liquid 883 mac be the same fluid. As an example, both liquid 210 and liquid 883 may consist of water or both liquid 210 and liquid 883 may consist of a liquid other than water. Alternatively, liquid 210 and liquid 883 may consist of different fluids, having different vapor pressure properties. As an example, liquid 210 may consist of water and liquid 881 may consist of ammonia or vise versa liquid 210 may consist of ammonia and liquid 833 may consist of water.

Supplemental heat to fortify the system may be applied to evaporator 425 or to any or all of the evaporators (425-*a*, Evp 2B, Exp. 2C) by an external heating source 411 such as electrical burners, burning natural gas or fossil fuel, or though solar energy 1412.

Additionally, solar energy 1412 may be applied to evaporators, 425 and evaporators (425-*a*, Evp 2B, Exp. 2C). Further, evaporators 425 and evaporators (425-*a*, Evp 2B, Exp. 2C) may be encased with a vacuum encasement 1413 to help prevent the loss of heat to the outside of the system.

In the present industry, there is a serious problem controlling the formation of scale on the various components of seawater distillation systems, particularly the scale formation on evaporators. Generally, the avoidance of scale formation requires that the seawater should not be concentrated or boiled down to less than one third of its original volume.

The following embodiment, involves diminishing scaling by reducing the concertation and build-up of salts in evaporator 425. Reducing salt concentration may be accomplished by implementing conduit 1447 to draw out concentrated seawater 210 from evaporator 425 and replacing it with fresh and less concentrated seawater 210 delivered by conduit 443. Regulators 487 may control the flow ofc concentrated seawater 210 leaving evaporator 425, while regulator 984 control the flow of fresh or less concentrated seawater 210 entering evaporator 425. In regulating the quantity of ingress and egress of seawater 210 in evaporator 425 the salt content is monitored, thus avoid scaling due to high salt concentration.

The concentrated seawater 410 drawn from evaporator 425, still contains useful heat. The heat from the concentrated seawater 410 for brine 1411) is recycled buck into the system by transporting the brine 1411 via conduit 1447. Conduit 1447 is submerged and passed through liquid 883 contained in each evaporator (425-*a* Evp. 2B, Evp. 2C) of the series of compartments. The brine 1411, as it is transported through conduit 1447 and passe through each successive evaporator, heat is given off and absorbed by liquid 883 contained within each of the sequential compartments thus recycling and contributing heat to, boil liquid 883. Consequently, the brins gradually becomes cooler as it passes through the series of compartment.

There has been great concern with regard to dumping concentrated brine into the ocean, resulting in environmental shock and harm to the environment. However, an additional advantage is realized when seawater 210 is drawn out of evaporator 425 before it becomes too concentrated. In doing so, the advantage is realized when expelling the high salt concentrated brine 1411 back into the ocean is avoided.

As previously illustrated in this embodiment, recycling usable heat from brine 1411, allows, the affordability to expel brine at less concentrated levels since much of the heat from the brine is recaptured. Traditionally, seawater is boiled down as much as possible in order to distill and extract the greatest amount of fresh water product from each boiling cycle. This practice, results in a great amount of energy being wasted. However, when the heat from the brine is recycled, there is less energy expended and the energy coms becomes less of an issue when the major portion of the heat is recycled back into the system.

As previously discussed, a heat containment element may be incorporated by encasing at least a portion evaporator (425-*a*, Evp 2B, Evp 2C) with a vacuum disposed within encasement 1413, allowing energy in the form of radiation to penetrate encasement 1413 and the vacuum layer to hear liquid 883 within each evaporator (425-*a*, Evp 2B, Evp 2C). Additionally, the vacuum encasement 1413 may be incorporated onto evaporator 425 to facilitate de heating of liquid 210. The radiation energy transforms into kinetic energy as it heats and boils liquid 883 or liquid 210. The heat in the form of kinetic energy in incapable of penetrating and passing through the vacuum layer of the encasement 1413, thus preventing the loss of heat to the outside of the encasement thus preserving the heat within its respective evaporator.

Figure 15:
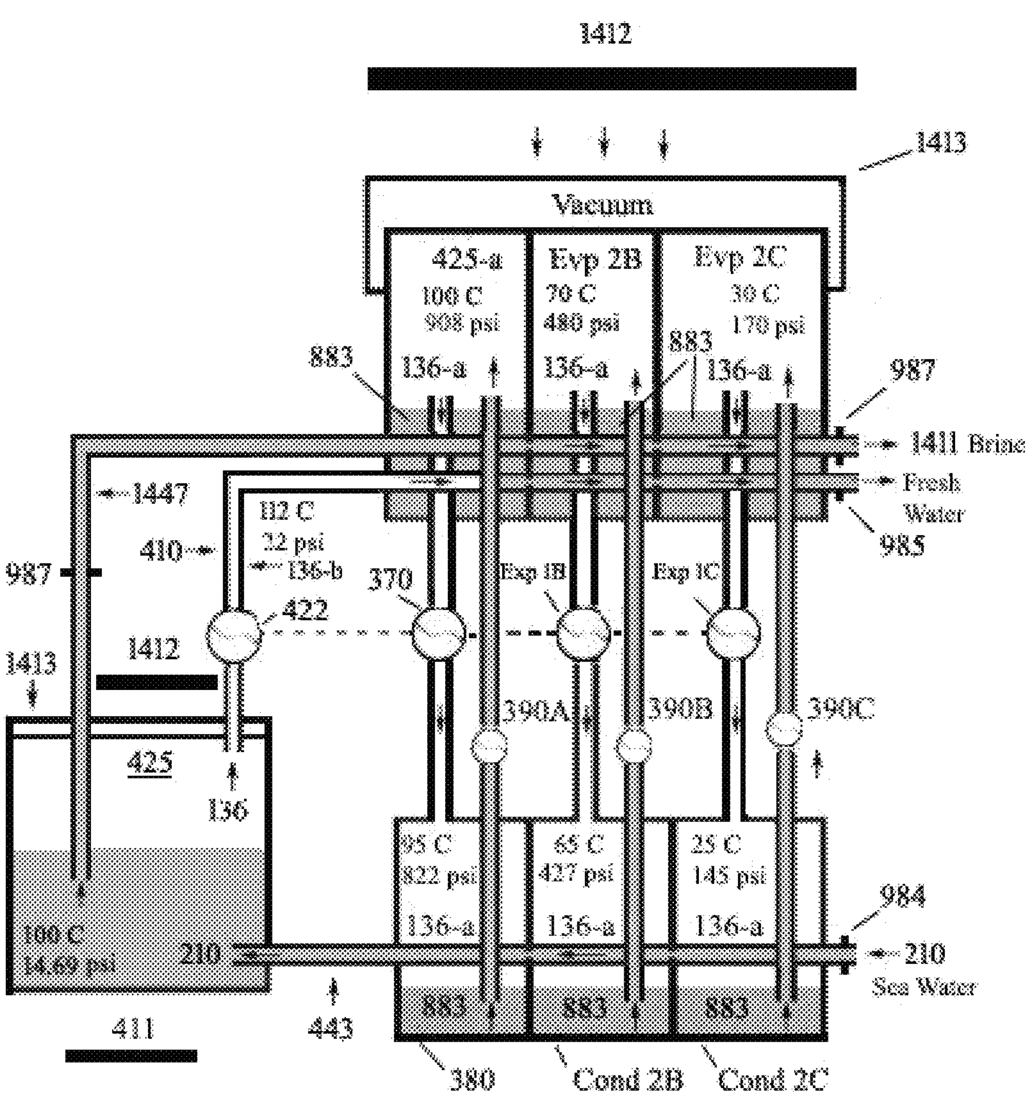

FIG. 15 illustrates a system similar to that depicted in FIG. 14. However, in FIG. 15 vapor 136 from evaporator 425 is compressed by compressor 422 and is directly transported through evaporators (425-*a*, Evp 2B, Evp 2C. All other elements depicted in FIG. 14 may have the same function and may be implemented in FIG. 15.

Figure 16:
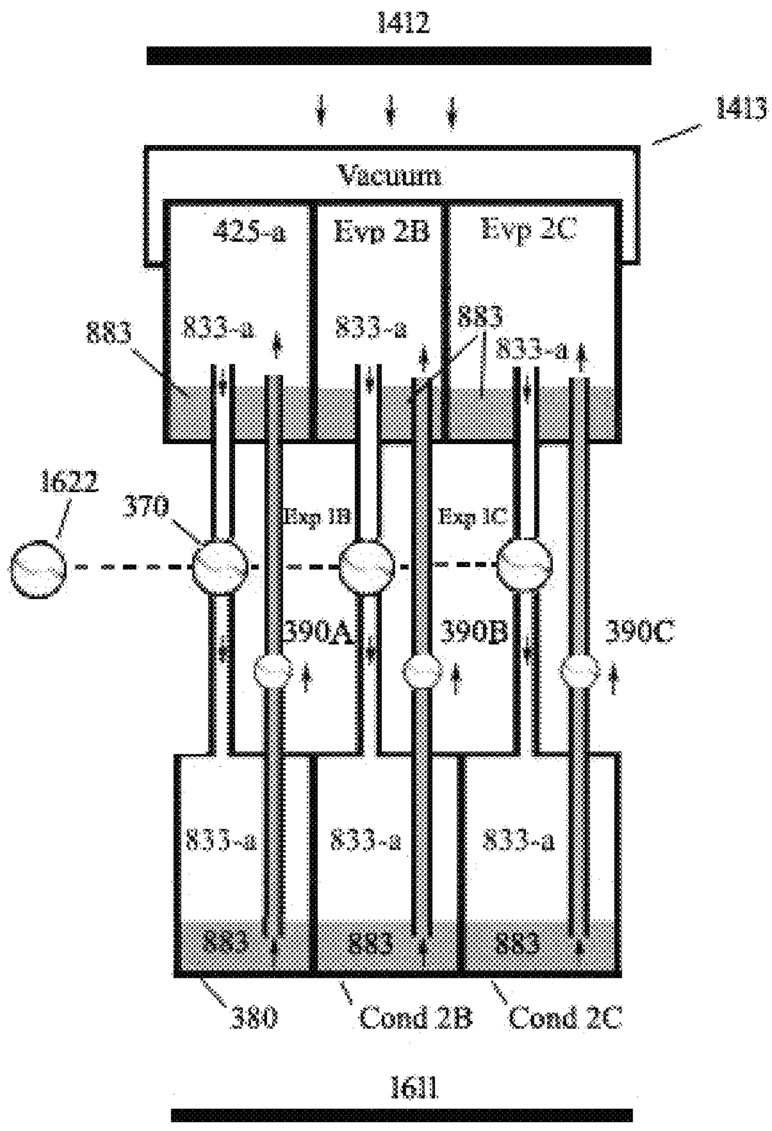
FIG. 16 illustrates a diagram of an energy producing system having a plurality of expanders interconnected and contributing energy to power a generator.

FIG. 16 illustrates an energy producing system in which the interconnected expanders (370, Exp 1B, Exp.1C) power generator 1622 rather that powering compressor 422 of the distillation system previously illustrated in FIG. 14.

Alternatively, and deriding on the application, expanders (370, Exp 1B, Exp. 1C) may power compressor 422, such as the compressor illustrated in FIG. 14. For the purpose of simplification, the compressor is not shown in FIG. 15.

Similar to the expansive section previously illustrated in FIG. 12 and FIG. 14, FIG. 15 depicts the series f % expanders (370, Exp 1B, Exp 1C) being interconnected. The individual expanders are in communication and located between their respective evaporator and condenser. Each cell may function as an independent unit with each expander of the series contributing energy to power generator 1622.

Again as previously discussed, the energy acting upon each expander is derived from the difference in pressure produced by the boiling liquid 883 in each evaporator and its paired condenser, wherein vapor 933 condenses into a liquid. Because the expanders an interconnected in series, the energy of the expanders (370, Exp 1B, Exp 1C), may function cumulatively and summed together. The resulting summation of the energy in turn may be transmitted to power generator 1622 or compressor 422.

In the instance in which expanders (370, Exp 1B, Exp. 1C), powers a compressor, the expanders when arranged in series, cumulatively displaces a greater volume of vapor 833-*a* than does the compressor, resulting in a mechanical advantage mechanism.

Again, pumps (390A, 390B, 390C) may be necessary to pump the precipitated liquid 883 from the low-pressure condenser to the high pressure evaporator in each cell.

The energy source may be derived from solar radiation. The solar energy 1412 may be in the form of solar radiation collected and concentrated with the use of reflective mirrors and directed to evaporator (425-*a*, Evp 2B, Evp 2C) to boil liquid 883. The resultant vapor 933-*a* arising from the boiling of liquid 833 causes an increase pressure in each respective evaporator which in turn exerts pressure on its paired expander.

A cooling source 1611 such as water or air, absorbs heat from condensers (380, Cond 2B, Cond 2C) causing vapor 833-*a* to condense resulting in low pressure in each condenser of the series.

As previously discussed, each expander in the series of compartments is powered by the difference in pressure between its respective evaporator and condenser and in turn the energy derived from each expander are summed together and transmitted to power generator 1622.

Again, as previously discussed, a heat containment element may be incorporated by encasing at least a portion of evaporator (425-*a*, Evp 2C, Evp 2C) with a vacuum disposed within encasement 1413, allowing energy in the form if radiation to penetrate encasement 1413 and the vacuum layer to heat liquid 883. The heat in the form of kinetic energy is incapable of penetrating and passing through the vacuum layer of encasement 1413, thus preventing the loss of heat to the outside of encasement 1413 and its respective evaporator.

It should be understood that the major principles of recycling heat are generally described herein and that them may exist variants or deviations that produce an equivalent outcome. It is the purpose of this disclosure to encompass these variations.

All embodiments described herein may be used solely or in any combination with one another as well as in partial form. Also, it should be understood that the use of, for example, pumps, one way valves or release valves, vacuumed one-way heat system, and so on, are utilized where needed, and in some descriptions are not mentioned in order to simplify the descriptions and avoid being redundant.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended it, cover alternate embodiments and lor equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

Figure 17:
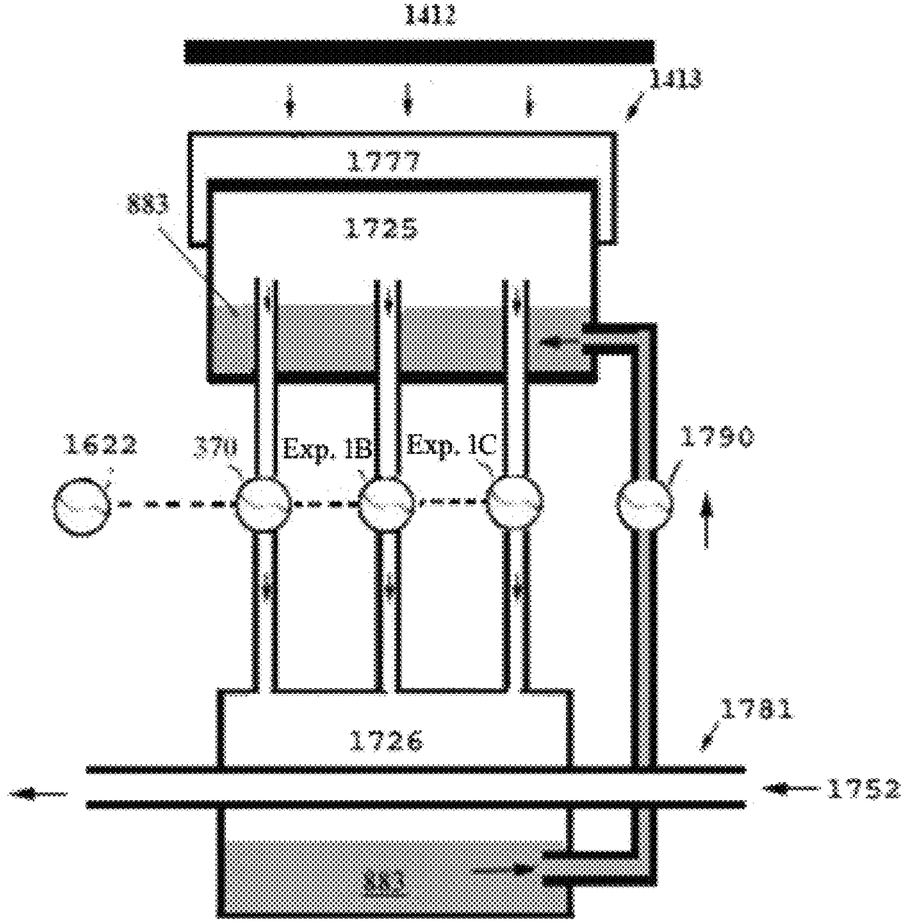
FIG. 17 illustrates a diagram of an energy producing system having a single evaporator and a single compressor with a plurality with a plurality of expanders interconnected and contributing energy to power a generator.

FIG. 17 describes an embodiment related to energy production. In this embodiment, the system contains a single evaporator 1725 and a single condenser 1726.

Solar energy is captured in evaporator 1725. Parabolic reflectors or reflective mirrors 1422 or other sources am used to concentrate, enhance and direct the solar radiation into evaporator 1725.

Additionally, similar to that described in FIGS. 11, 12, 14, 15 and 16, a vacuum layer 1777 is disposed within encasing 141, and encapsulating at least a portion of evaporator 1725. Thus, preventing heat to escape from evaporator 1725 to the outside of the system.

Again, as previously discussed, sun rays consist of electromagnetic radiation capable of travel through a vacuum. The radiation, capable of passing through the vacuum layer 1777, allows energy in the form of radiation to penetrate the encasing 1413 and the vacuum layer 1777, and the radiation energy transforms into kinetic energy as it heats and boils the liquid NIH3 883 in evaporator 1725. Further, the heat in die form of kinetic energy is incapable of penetrating and passing through die vacuum layer 1777, thus preventing the loss of heat to the outside of the evaporator 1725.

In utilizing this system, radiation energy is allowed to enter evaporator 1725, but the transformed kinetic energy, from the radiation, is prevented from escaping outside evaporator 1725. The heat containment system helps prevents heat loss to outside of evaporator 1725 and efficiently preserves the energy to pass through and actuating expander 1770(*a*), 1770(*b*), and 1770(*c*), for useful work.

The pressure difference between evaporator 1725 and condenser 1726, drives expanders 1770(*a*), 1770(*b*), and 1770(*c*). (their functions similarly described when describing the expanders in FIGS. 12, 13, 14, 15 and 16. The energy derived from each expander in turn powers generator 1622 to produce electricity. The collective energy derived from each expander are summed together and transmitted to power generator 1622. Note. In certain applications, when it becomes more suitable, one singular expander may be implemented rather than implementing a plurality of expanders.

Conduit 1781 transports cool water 1752 through condenser 1726. The vapor form of $NH_3$ condensed into a liquid form of NH3 as heat is absorbed by the cool w ater 1752 contained in conduit 1781. The condensed NH3 in condenser 1726 in pumped into evaporator 1726 by pump 1790.

Having sufficient access to a cooling source to cool condenser 1726 is as crucial in powering the system as having a sufficient heating source tv heat evaporator 1725. One method of providing a sufficient cooling source is to pipe in cool water 1752 from a nearby body of water, either the ocean or lake. The cool water 1752 may be pumped or siphoned through condenser 1726. Siphoning the cool water 1752 through condenser 1726 requires much less energy than pumping cool water 1752 and would most likely be the method of choice.

Figure 18:
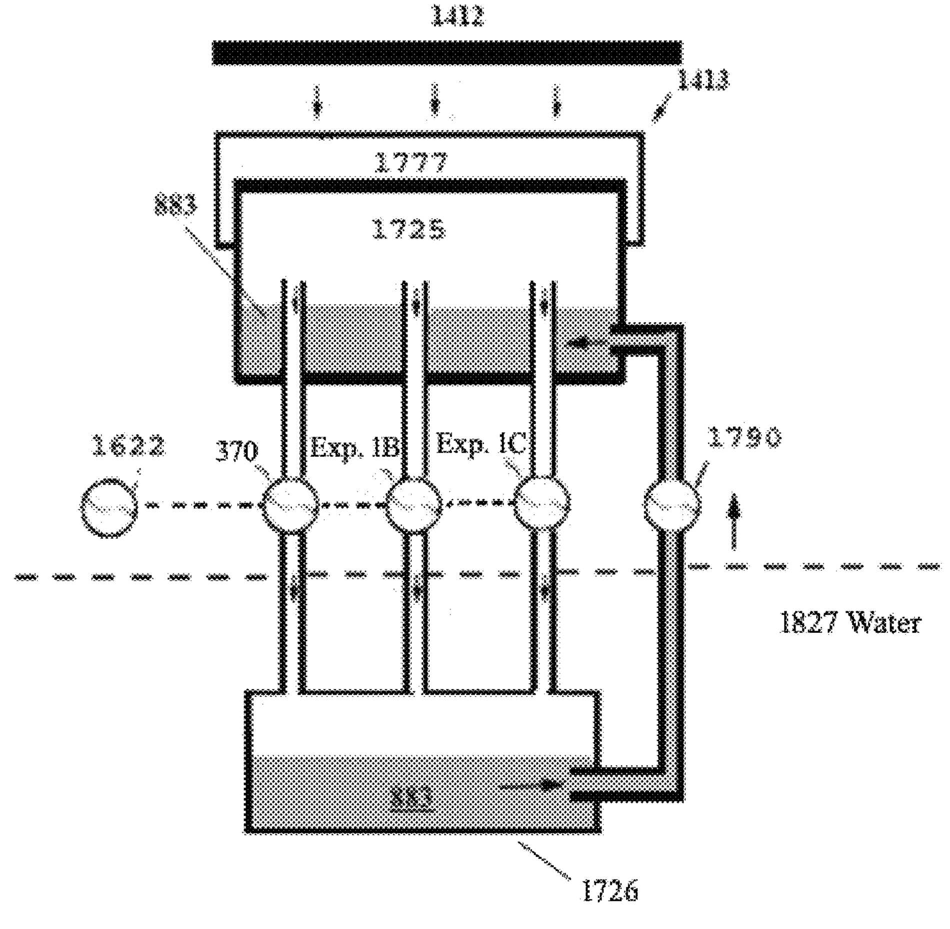
FIG. 18 illustrates a diagram of an energy producing system submerging the condenser in the form of piping, into a body of cool water.

FIG. 18 illustrates an alternative method of providing an abundant cooling source. In this embodiment condenser 1726 is submerse in a body of cool water 1827. The submerge condenser 1726 may be in a form of piping (Not shown here) containing the vaporized NH3 833 and becoming condensed into the liquid form of NH3 883 as heat is absorbed font the body of cool water 1927. As an example, evaporator 1725 portion of the system may be placed on a dock, or a barge and condenser 1726 immersed into a cool body of water 1827 of a lake, river or ocean. Fans (not shown) may be implemented to circulate the water pass condenser 1726.

Many types of liquids may be used in this system. However, the liquid selected should have properties of producing high vapor pressures relative to low boiling temperatures. Operating a system having lower temperatures, provides for a more efficient system in that grater vapor pressures may be achieved at much lower temperatures. When operating a system at lower temperatures, malfunctions arm reduced as well as reducing the rate of heat loss to the outside of the system.

For example, the vapor pressure of boiling water at 100° C. provides a vapor pressure of 14.6 psi while the vapor pressure of $NH_3$ at 100° C. provides a pressure of 908 psi. It is possible to operate an electrical generating system at 100° C. using $NH_3$ having a vapor pressure of 908 psi. However, at 100° C., it is not possible to operate a generator using water having a vapor pressure of only 14.6.

To operate an electrical generating system using water, temperatures of well over 1000° C., is required. In the present art, in order to achieve these high temperatures, a multitude of reflective mirrors is required, having greater risk of malfunctions and difficulty managing the system. It can also be very dangerous during repairs Additionally, ecological consequences arise due to birds being attracted t) the reflection of mirrors.

Low temperature heat sources, as opposed to higher temperature heat, is more accessible and the availability of the source, are more abundant. In addition, the absorption rates at lower temperatures are greater than that of higher temperature. In the embodiment of FIG. 17 and FIG. 18, only reflectively fie reflective mirrors at much lower temperatures am necessary to obtain high vapor pressures capable powering a generator. In effect, the use of a substance having a high vapor pressure relative to its boiling point (such as $NH_3$) produces a mechanical advantage in that the absorption of a greater amount of heat at a lower temperature translates into a much higher vapor pressure. The higher vapor pressures are necessary for powering an expander and thus a generator.

Figure 19:
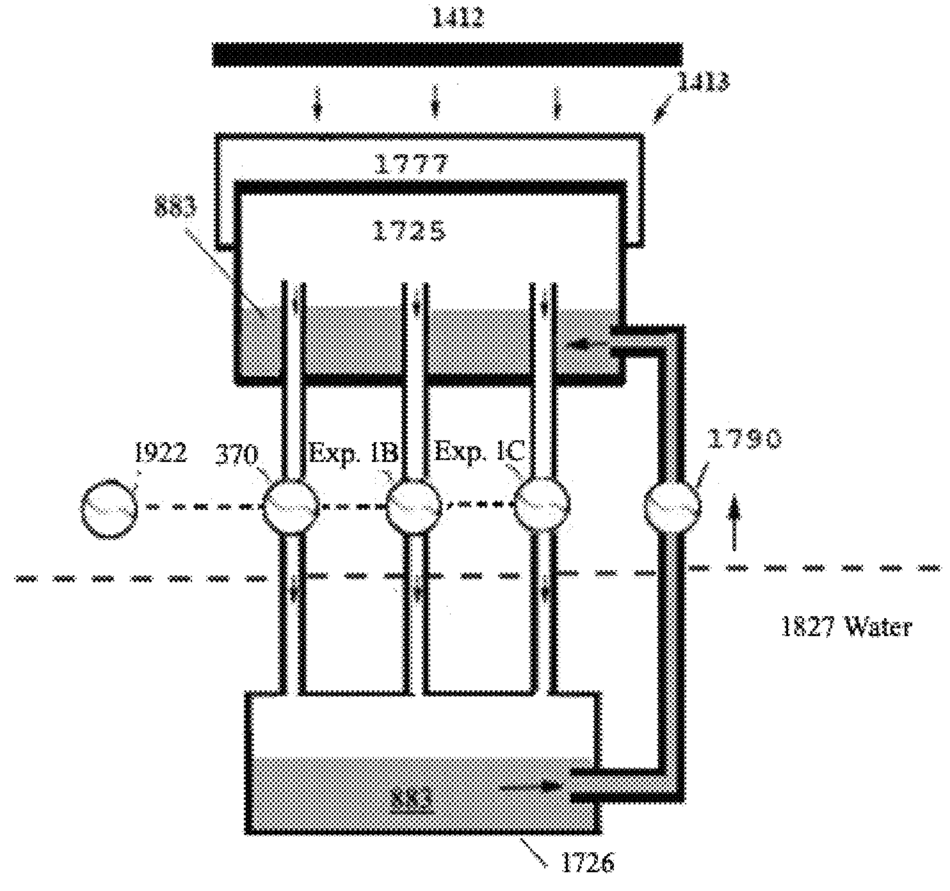
FIG. 19 illustrates a diagram of an energy producing system submerging the condenser, in the form of piping, into at body of cool water and powering a compressor.

FIG. 19 illustrates a diagram of an energy system submerging the condenser 1726, in the form of piping, into a body of cool water and powering a compressor 1922.

Figure 20:
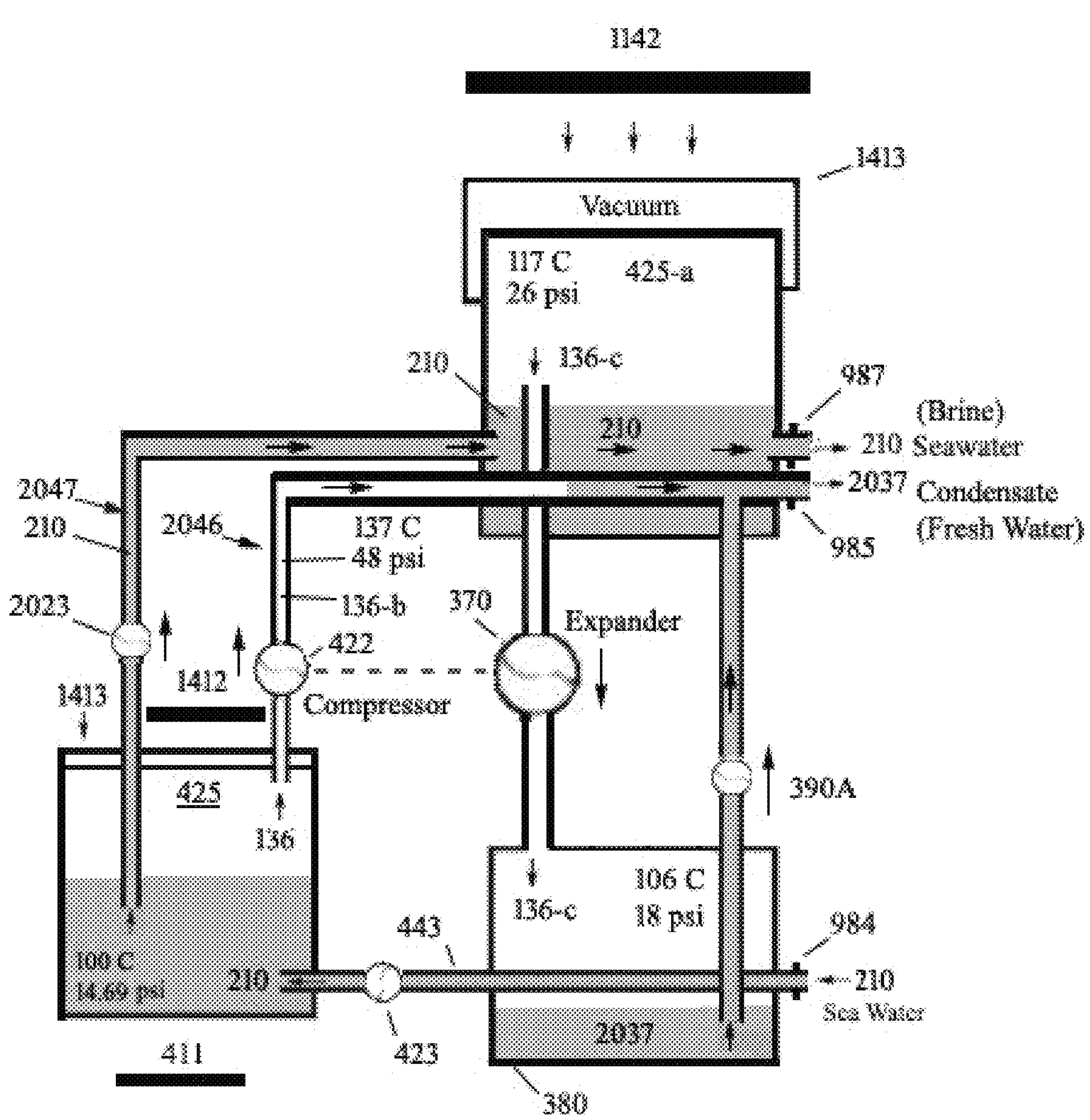
FIG. 20 illustrates a diagram of an distillation system containing a sing fluid throughout the system with one expander.

FIG. 20 illustrates a distillation system, wherein the second liquid NH3 833, depicted in FIG. 14), is replaced with seawater 210 in evaporator 425 and 425-*a*. In this system, both evaporator 425 and evaporator 425-*a* contain seawater. Again, this idea provides a low cost, energy-saving method of distilling or desalinating water. Similar as to that described in the previous system, the principal feature of this system utilizing mechanical leverage in which compressor 422 is driven by expander 370. In this embodiment, expander 370 displaces a greater volume of vapor than compressor 422, thus providing a mechanical advantage to drive compressor 422.

In this embodiment evaporator 425 contains seawater 210 at its boiling point and corresponding pressure. Compressor 422 is placed in communication with evaporators 425 and 425-*a* via conduit 2046. Vapor 136. (generated from the boiling of seawater 210, within evaporator 425, is compressed by compressor 422 and the compressed vapor 136-*b* is transported by conduit 2046 into evaporator 425-*a*.

Conduit 2046 containing vapor 130-*a*, is submerged and passed through seawater 210 contained in evaporator 425-*a*. The portion of conduit 2046 passing through evaporator 425-*a* is compound of a thermal conductive material, allowing the transfer of heat from vapor 136-*b* to the seawater 210 contained in evaporator 425-*a*. The level of heat transferred is sufficient to cause the seawater 210 in evaporator 425-*a* to boil, generating vapor 136-*c*. In the process of vapor 136-*b* (contained in conduit 2046) losing heat to the seawater 210, contained in evaporator 425-*a*), vapor 136-*b* condenses within conduit 2046.

Expander 370 is placed between the high-pressure evaporator 425-*a* and low-pressure condenser 380, Expander 370 is actuated by the difference in pre-orc between evaporator 425-*a* and condenser 380. The difference in pressure is caused by the boiling of the seawater 210 in evaporator 425-*a* and the condensation of vapor 136-*c* in condenser 380. The work produced by expander 370 expander is mechanically leveraged to drive compressor 422. Wherein, expander 370 displaces a greater volume of vapor than compressor 422, thus providing a mechanical advantage, to drive compressor 422.

Conduit 443, having thermal conductive properties, transports tool seawater 210 through condenser 380. Pump 423 pump seawater 210 into evaporator 425 via conduit 443. As the hot vapor 136-*c* is emitted from expander 370 and comes into contact with conduit 443, heat is transferred to the cool seawater 210, contained in conduit 443, causing vapor 136-*c* to condense into condensate 2037 (fresh water). The cool seawater 210 consequently becomes heated and is subsequently transported into evaporator 425.

Pump 390A pumps condensate 2037 from condenser 380 into conduit 2046 and subsequently out of the system. One-way valve (not shown here) may be applied as needed to ensure proper flow of the condensate 2037 to exit the system.

In another embodiment providing from the diminishment of scaling within the system, is achieved by reducing the salt concentration in evaporator 425. The reduction of salt concentration in evaporator 425 is accomplished by implementing conduit 2047 to draw out concentrated seawater 210 from evaporator 425 and replacing the concenrated seawater with fresh and has concentrated seawater 210. The less concentrated seawater is, delivered into evaporator 425 via conduit 443. Pump 2023 controls the flow of concentrated seawater 210 leaving evaporator 425, while pump 423 controls the flow of fresh or less concentrated seawater 210 entering evaporator 425. In regulating the quantity of ingress and egress of seawater 210 in evaporator 425, the salt content is monitored. Thus, helping to avoid sealing due to high salt concentration.

Following is an illustration of a mechanical advantage system for distilling seawater. Wherein, both evaporators 425 and 425-*a* contain seawater.

In thia example, again referring to FIG. 20, evaporator 425 contains seawater 210 at its boiling point at a temperature of 100° C. and pressure of 14.60 psi. Compressor 422 compresses vapor 134 into conduit 2046 to a pressure of 48 psi and temperature of 137° C. The temperature of the seawater within evaporator 425-*a* is 117° C. having a vapor pressure of 24 psi and the temperature of condenser 380 is 106° C. having a vapor pressure of 18 psi.

| | Temperature | Pressure | |
|---|---|---|---|
| Evaporator 425: | 100° C. | 14.69 psi | (P1) |
| Vapor in conduit 2046: | 137° C. | 48 psi | (P2) |
| Evaporator 425-a: | 117° C. | 26 psi | (P3) |
| Condenser 380: | 106° C. | 18 psi | (P4) |

Using thew parameters and having compressor 422 displace a volume of 1 $m^3$, it is determine the expander 370 displaces a volume 4.1 $m^3$.

$$(P2-P1)V1=(P3-P4)V2$$

$$(48\text{ psi}-14.69\text{ psi})(1\text{ m}^3)=(26\text{ psi}\cdot 18\text{ psi})(V2)$$

$$33.3(\text{psi})(1\text{ m}^3)8\text{ psi}(V2)$$

$$V2=4.1\text{ m}^3$$

At equilibrium of the system expander 370 must displace approximately four times the volume than that displaced by compressor 422.

A mechanical advantage of at least 4.1 $m^3$ required tor the system to operate. If the expander 370 displaces a greater volume of 4.1 $m^3$, compressor 422 is driven to compress vapor 136 to a higher pressure and temperature. Thus, driving the distillation system forward.

Pump 2023 controls the flow of seawater 210 pumped from evaporator 425 into evaporator 425-*a*, while regulator 987 controls the flow of concentrated seawater 210 leaving evaporator 425-*a*. Regulator valve 985 controls the release of condensate 2037 (fresh water) leaving the system.

A motor (not shown here) may be applied to help power compressor 422. Alternatively, a motor may be incorporated within compressor 422 functioning as a single unit to help power corepressor 422.

Figure 21:
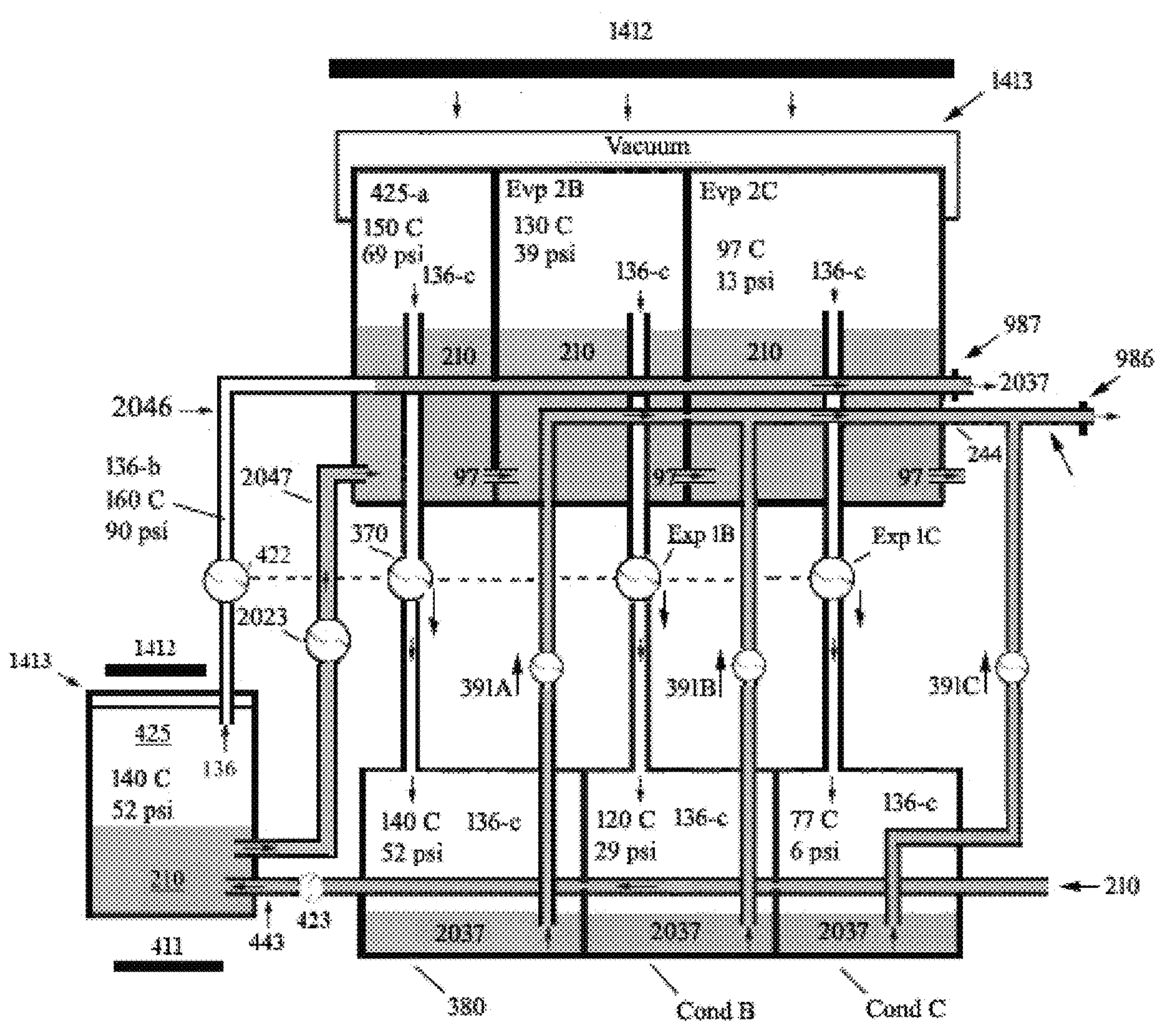
FIG. 21 illustrates a diagram of a distillation system containing a single fluid throughout the system with multiple expanders.

FIG. 21 illustrates at diagram of a distillation system, utilizing a plurality of cells arranged in a successive series. Wherein each sell is comprised of an evaporator in communication with its respective expander and condenser. Again, the series of expanders are combined to produce a stepped-up mechanical advantage to drive compressor 422. Also, similar to that previously described in FIG. 14, a counter current latent heat exchange system is utilized.

In this example the series of each evaporator (425-*a*, Evp 2B, Evp 2C), contain seawater 210 and its vapor 136-*c* and each evaporator is coupled to a series of condensers (380, Cond 2B, Cond 2C), respectively. Each condenser of the series (380, Cond 2B, Cond 2C) contains water condensate 2037. Conduit 2046 transports compressed vapor 136-*b* and its condense 2037 and is passed through and submerged in seawater 210 of each successive compartment within the series of evaporators (425-*a*, Evp 2B, Evp 2C). Conversely, the conduit 443 carrying the cool seawater 210. (in the opposite direction), is passed through each successive compartment within the series of condensers 1390. (Cond 2B, Cond 2C). Conduit 244 carrying the hot condensate 2037 may be located above conduit 443 carrying the cold seawater 210. Again, the hot vapor 136-*b* and its condensate 2037 travel in one direction and the cold seawater 210 travels within conduit 443 in opposite directions within their respective conduit. In each cell, the conduit carrying the hot vapor 136-*b* and its condensate 2037 gives off heat and causes boiling of the seawater 210. (generating vapor 136-*c*, within each of its respective evaporator.

Regulators 97 controls the flow of seawater 210, passing through each evaporator of the series (425-*a*, Evp 2B, Evp 2C), and monitors the rate of seawater 210 flowing into the next successive evaporator of lower temperature an pressure. Eventually leading to the outside of the system.

Pump 423 controls the pressure and flow of seawater 210 into evaporator 425 from the series of condensers (380, Cond 2B, Cond 2C).

Conduit 443, carrying the cold seawater 210 absorbs heat from the vapor 136-*c* within its respective condensers (380, Cond 2B, Cond 2C). The vapor 136-*c* produced by evaporators (425-*a*, Evp 2B, Evp 2C), is communicated and condensed by condenser (380, Cond 2B, Cond 2C) respectively. Vapor 136-*c* condensates as it comes into contact and gives off heat to the seawater 210 contained in conduit 443. Seawater 210 becomes progressively hotter as it approaches evaporator 425.

Expander (370, Exp 1B, Exp 1C) is configured between evaporators (Evp 425-*a*, Evp 2B, Evp 2C) and condensers (380, Cond 2B, Cond 2C) respectively, and may drive compressor 422. It energy is derived from the difference in pressure of evaporators (Evp 425-*a*, Evp 2B, Evp 2C) and its paired condensers (380, Cond 2B, Cond 2C). The energy derived by each expander of the series, cumulatively sun together to displace a greater volume of vapor than does compressor 422, resulting in mechanical advantage, as described in FIG. 13. The cumulative energy produced by the series of expander is transmitted to power compressor 422.

Pumps (391A, 391B, 391C) may be necessary to deliver the precipitated water condensate 2037 from each respective condenser (380, Cond 2B. Cond 2C) into conduit 244.

The condensate contained in each condenser of the series still containing useful heat, may be pumped into and transported through conduit 244 into the next successive evaporator of lower temperature. Thereby, contributing heat to each evaporator of lower temperature, as the condensate 2037 contained in conduit 244 transverse each successive evaporator of the series.

Conduit 244 is equipped with regulator 486, controlling the outflow of condensate 2037 to the outside of the system.

One-way valves in conduit 2046 and conduit 244 as well as conduit 443, (not shown here), may be placed where needed to help keep each compartment thermally segregated and prevent backflow within the system.

The evaporator of any of the compartments of the system nay be fortified with the implementation of heat, either provided by solar reflectors or other means. Supplemental heat to fortify the system may be applied to evaporator 425 of to any or all of the evaporators (425-*a*, Evp 2. Evp. 2C) by an external heating source 1412 such sources may consist of electrical burners, burning natural gas or fossil fuels or through solar energy.

For the purpose of illustrating an example. FIG. 21 depict, only three compartments containing evaporators (Evp 425-a, Evp 2B, Evp 2C) as well as their respective expanders and condensers. However, the use of a greater number of chambers provides for a more gradual temperature gradient in both the incoming seawater and outgoing condensate of which improves the efficiency of the system.

The series of compartmentalized evaporators (Evp 425-a, Evp 2B, Evp 2C) may be encased with a vacuumed one-way heat system. Heat from sun rays reflected from reflectors, or the like, penetrate a vacuum layer encased in glass, or any material that allows the rays of the sun to penetrate. Thus, contributing heat to the series evaporators (Evp 425-a, Evp 2B, Evp 2C) for the boiling of seawater 210. Sun rays are electromagnetic radiation that can be transformed into heat. Sense electromagnetic waves are not impeded by a vacuum, heat can be transferred through a vacuum via radiation and may transform its energy into kinetic energy, as the seawater 210 becomes heated. The heat in the evaporators thus becomes trapped and unable to escape to the outside as the kinetic energy of the molecules of seawater 210 are unable to penetrate and pass the vacuum barrier. This configuration may function as a heat trap per se.

The system may be composed of numerous cells to assure a gradually heat exchanged between the vapor 136-*b* and its condensate 2037 contained in conduit 2046 to the incoming seawater 210 contained in conduit 443. In the process heat is given off from the vapor 136-*b* and its condensate 2037 to produced vapor 136-*c*. The heat is subsequently transferred to the incoming seawater 210, consequently the temperature of the incoming seawater 210 gradually increases as it absorbs beat from vapor 136-*c*. As the respective fluids within each conduit, (2046 and 443), enters each succeeding cell, the temperatures of the condensate 2037 gradually decrease and the temperature of the seawater 210 increase. At the hot and the cold ends of the system, the condensate 2037 and the seawater 2110 should have reached close to the same temperature of one another.

As previously described, in each condenser (380, Cond 2B, Cond 2C), vapor 136-*c* makes contact with conduit 443 and condenses into condensate 2037. Condensate 2037, still containing useful heat is pumped into conduit 244 leading into and traversing the seawater 210, (or brine), in the next successive evaporator of lower temperature, wherein condensate 2037 having a higher temperature contributes heat for boiling seawater 210.

For example, condensate 2037 contained in condenser 380 is pumped by pump 391A into conduit 244 leading into EVP 2B. Likewise, as vapor 136-*c* condenses in Cond 2B, condensate 2037 is pumped by pump 391B into conduit 244 leading into EVP 2C and so on.

As condensate 2037 is pumped into conduit 244 and transverses die seawater 210 contained in the successive evaporator of lower temperature, condensate 2037 having a higher temperature contributes heat for boiling the seawater 210 in the successive evaporator.

Regulating valve in the form of one-way valves or pumps (not shown here) are placed as needed along conduit 2046 and 244 to avoid back flow of condensate 2037 and to direct condensate 2037 into the next successive evaporation.

Pump 2023 regulates the quantity of seawater 210 drawn from a evaporator 425 and fed into conduit 2947 and subsequently conveyed through evaporators (425-*a*, Evp 2B, Evp 2C) via regulators 97.

The concentrated seawater 210 drawn from evaporator 425, still contains useful heat. The heat from the concentrated seawater 210 (or brine) is recycled back into the system by transporting die brine 210 through conduit 2047. Pump 2023 pumps the concentrated seawater 210 from evaporator 425 into die first evaporator 425-*a* of the series of the evaporators. Thereafter, in each of the series of evaporators (425-*a*, Evp 2B, Evp 2C), regulator 97 controls the flow of seawater 210 passing through each successive evaporator and monitors the rate of seawater 210 flowing into the next succeeding evaporator of lower temperature and eventually to the outside of the system. Heat is given off and absorbed by the boiling of the seawater 210 in each successive evaporator as the seawater 210 passes through each evaporator of the series. Consequently, the brine gradually becomes cooler as it passes through the series of evaporators.

There has been great concern about dumping concentrated brine into the ocean, resulting in environmental shock and harm to the environment. To overcome this concern, seawater 210 is drawn out of evaporator 425 before it becomes too concentrated and less concentrated brine is expelled back into the ocean. In addition, the heat from the brine is extracted and recycled back int the system, thereby conserving heat.

Figure 22:
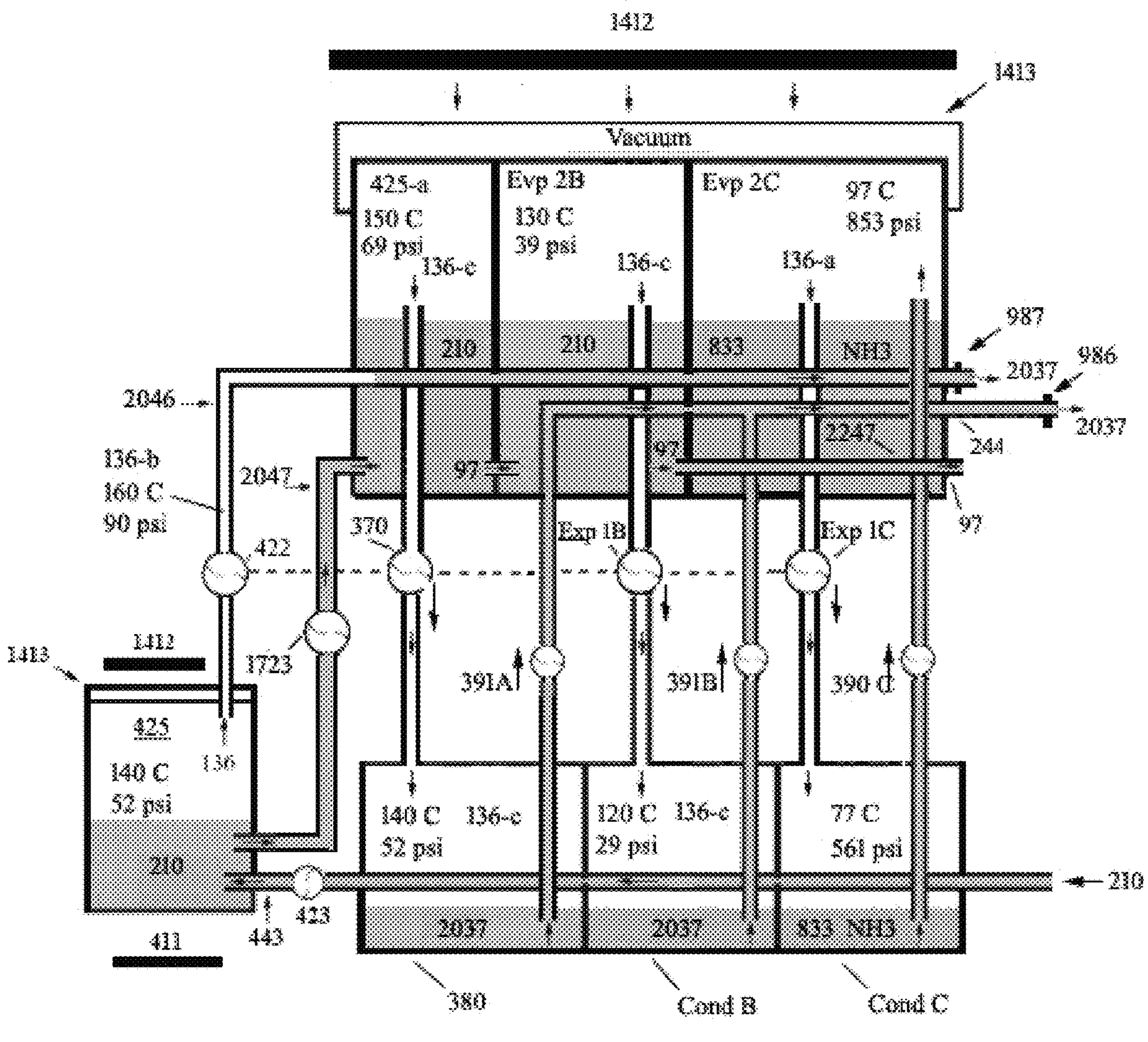
FIG. 22 illustrates a diagram of a distillation system containing a first fluid powering at least one expander and a second fluid powering an additional expander.

FIG. 22 illustrates a distillation stem wherein two previously described embodiments are combined. The first embodiment of the system consists of the compressive side and expansive side of the system each utilizing water (as described in FIG. 211. The second embodiment of the system consists of the compressive side utilizing water and the expansive side uses a second fluid having different vapor pressure properties than that of water (as described in FIG. 14). Again, in this example the second fluid $NH_3$ (833).

These two embodiments combined into one system may be useful when the difference in vapor pressure between the evaporator and its paired condenser is small and the force produced is unable to substantially power its respective expander.

As an example, when using seawater 210 and referring to the series of compartments of FIG. 21 the vapor pressure of Evp 2C is 13 psi at the temperature of 97 C and the vapor pressure of Cond C is 6 psi at the temperature 77 C. The difference in vapor pressure between the evaporator (Evp 2C) and condenser (Cond C) is only 7 psi of which may be insufficient to power expander (Exp 1C).

To help remedy the slight difference n vapor pressure to power (Evp 2C), it is possible to increase the difference in vapor pressure between evaporator (Evp 2C) and condenser (Cond C) by substituting the fluid 210 (seawater) contained in evaporator (Evp 2C) and condenser (Cond C) with the fluid 833 $NH_3$). By substituting the fluid 833 ($NH_3$), sufficient power may be produced to adequately drive expander (Exp 1C).

The Following illustrates the increase in the difference of vapor pressure between evaporator (Evp 2C) and condenser (Cond C) when substituting fluid 210 with fluid 833 in both of these chambers. For comparison, the temperature parameter in these chambers remain the same as depicted in both FIG. 21 and FIG. 22.

Again, referring to FIG. 22, the fluid contained in (Evp 2C) is 833 ($NH_3$) having a temperature of 97 C. and vapor pressure of 853 psi. The fluid contained in (cond C) is also 833 ($NH_3$) having a temperature of 77 C and a vapor pressure of 561 PSI.

| | Temperature | Pressure |
|---|---|---|
| When using seawater 210: | | |
| (Evp 2C): | 97° C. | 13 psi. |
| Cond C: | 77° C. | 6 psi. |
| Vapor differential is: | (13-6) psi = 7 psi. | |
| When using NH3 833: | | |
| (Evp 2C) | 97° C. | 561 psi. |
| Cond C: | 77° C. | 853 psi. |
| Vapor differential is: | (853-561) psi = 292 psi. | |

The vapor pressure difference between evaporator (Evp 2C) and condenser (Cond C) is now 292 psi when using the second fluid 833 ($NH_3$). This produces a substantial increase in vapor pressure differential, sufficient to power expander (Exp 1C).

The system may also include parameters wherein the volume of gas displaced by the expander equals the volume of gas displaced by the compressor.

The substitution of fluid 210 with fluid 833 ($NH_3$) has a twofold usefulness when used at the lower temperature spectrum of the series of cells. In addition to increasing vapor pressure differential it also increases the raw of heat exchange between the evaporator and condenser. Hence, the rate of heat exchange between the outgoing condensate 2037 and incoming seawater 210 has increased.

What is claimed is:

1. A distillation system comprising:

a first evaporator containing in a first portion a first liquid having a first temperature which is at the first liquid's boiling point;

a first conduit in which a first vapor of the first liquid received from the first evaporator is compressed by a compressor, thus causing the first vapor in the first conduit to have a temperature, higher than the first temperature;

a first expander configured to drive the compressor to compress the first vapor from the first evaporator into the first conduit, and, the first conduit having thermal conductive properties wherein the first conduit containing a first fluid comprised of at least one member of the group consisting of the first vapor and a condensate of the first vapor passes through a second evaporator, at least a portion of the first vapor within the first conduit condenses into the condensate of the first vapor, and, wherein the first expander driven by a second vapor of the first fluid expands the second vapor contained by the second evaporator into a first condenser, the first liquid contained in the second evaporator having a third temperature which is at the liquid's boiling point of the first liquid contained in the second evaporator but is lower than the second temperature, such that the boiling of the first liquid contained in the second evaporator occurs, generating the second vapor, when the first conduit is passed from the first evaporator and through the second evaporator;

wherein the third temperature is greater than a fourth temperature of the second vapor in the first condenser, further comprising a second conduit, having thermal-conductive properties, transporting the first liquid, having a fifth temperature lower than the fourth temperature, to the first evaporator after passing through the first condenser and absorbing therein heat from the second vapor having the fourth temperature, and causing a condensate of the second vapor into a second liquid.

2. The distillation system of claim 1, wherein a pump is provided for pumping the second liquid from the first condenser to a second evaporator.

3. The distillation system of claim 1, wherein a mechanical advantage is applied between the first expander and the compressor, wherein the first expander displaces a greater volume of vapor than the compressor.

4. The distillation system of claim 1, wherein the second conduit is passed through at least one additional condenser before reaching the first condenser and first evaporator, so that the first liquid absorbs heat also from the at least one additional condenser, the first condenser and the at least one additional condenser forming a series of condensers, leading to the first condenser and first evaporator, with gradually increasing temperatures, and, wherein the first conduit, leaving the first evaporator and into the second evaporator, and, passing, through at least one additional evaporator, so that the first fluid loses heat also to the at least one additional evaporator, the second evaporator and the at least one additional evaporator forming a series of evaporators with gradually decreasing temperatures, wherein the second vapor of each evaporator contained in the at least one evaporator is in fluid communication with a paired condenser of the at least one condenser; the second vapor condenses into the second liquid when the second vapor comes in contact with the second conduit containing the first liquid.

5. The distillation system of claim 4, wherein between each pair of the at least one additional evaporator and the at least one additional condenser an additional expander is placed and used to help drive the compressor, further providing an additional pump to pump the second liquid from the at least one additional condenser to the at least one additional evaporator.

6. The distillation system of claim 5, wherein the energy derived from each additional expander are summed together and transmitted to power the compressor.

7. The distillation system of claim 5, wherein the compressor is powered by at least one of the group consisting of an external motor, the first expander and each additional expander.

8. The distillation system of claim 1, wherein at least an evaporative portion of the system is insulated using a vacuum encasement.

9. The distillation system of claim 1, in a heat containment application, wherein at least one of the group consisting of the first evaporator, the second evaporator and the at least one additional evaporator containing the first liquid and, comprising an encasing encapsulating the at least one of the group consisting of the first evaporator, the second evaporator and the at least one additional evaporator and a vacuum disposed within the encasing, and the encasing allows energy in the form of radiation to penetrate the encasing and the vacuum layer, and the radiation energy transforms into kinetic energy as the kinetic energy heats and boils the first liquid contained in at least one of the group consisting of the first evaporator, the second evaporator and the at least one additional evaporator, further the heat in the form of kinetic energy is incapable of penetrating and passing through the vacuum layer, thus preventing the loss of heat to the outside of the encasing of the at least one of the group consisting of the first evaporator, the second evaporator and the at least one additional evaporator resulting in greater energy efficiency to drive the expander.

10. The distillation system of claim 1, wherein a third conduit, having thermal conductive properties, transporting the first liquid from the first evaporator, having the first temperature, through the second evaporator, and, passing, through at least one additional evaporator, so that the first liquid loses heat to the second evaporator and to the at least one additional evaporator, the second evaporator and the at least one additional evaporator forming a series of evaporators with gradually decreasing temperatures.

11. The distillation system of claim 1, wherein the first liquid and second liquid is at least one of the group consisting of water and a liquid other than water.

12. The distillation system of claim 1, wherein a heat exchange system comprising at least one closed compartment containing in a first portion the second liquid having the third temperature which is at the second liquid's boiling point; the first conduit, after passing through the first evaporator, containing a first fluid comprised of at least one of the group consisting of the first vapor and the condensate of the first vapor having the second temperature which is higher than the third temperature and submerged in the second liquid, causing at least a portion of the second liquid to absorb heat from the second temperature and boil within the first portion of the at least one closed compartment, and thus convert to the second vapor; and, transporting the first liquid to the first evaporator from a second portion of the at least one closed compartment and having the fifth temperature, which is lower than the third temperature, and passing through the second portion of the at least one closed compartment where the second vapors, come in contact with the second conduit containing the first liquid having the fifth temperature, causing the second vapors to lose heat and condense, and thus join the second liquid in the second portion of the at least one closed compartment; further comprising a pump for the delivery of the second liquid from the second portion to the first portion of the at least one closed compartment.

13. The distillation system of claim 1, wherein the system comprises a plurality of closed compartments, which are adjacent to each other, each closed compartment having a pressure and thus corresponding third temperature and boiling point, such that to create a series of closed compartments having a gradually changing third temperature and corresponding boiling point of the second liquid from a first end of the series to an opposite second end, as the first fluid travels through the first conduit from the first end to the second end of the series and the first liquid travels through the second conduit from the second end to the first end of the series, where the third temperature in each closed compartment is lower than the corresponding second temperature and higher than the fifth temperature.

14. The distillation system of claim 1, The energy recycling system of claim 10, wherein a system to drive the compressor of a coupled to the compressor, the second expander configured between the first portion and the second portion of the at least one closed compartment; and the second portion having a fourth temperature lower than the first portion having the third temperature, and the second expander powered by the temperature and corresponding pressure difference between the first portion and second portion of the at least one closed compartment.

15. The distillation system of claim 1, wherein a mechanical advantage is applied between the second expander and the compressor, the mechanical advantage is achieved by at least one of the group consisting of the second expander displacing a greater volume of vapor than the compressor and the second expander displacing vapor having different vapor pressure properties than that displaced by the compressor.

16. The distillation system of claim 1, wherein the energy derived from each second expander of the at least one closed compartment are summed together and transmitted to power the compressor.

* * * * *